United States Patent
Wang et al.

(10) Patent No.: US 10,976,410 B1
(45) Date of Patent: Apr. 13, 2021

(54) GENERATING DATA USING RADAR OBSERVATION MODEL BASED ON MACHINE LEARNING

(71) Applicant: AURORA INNOVATION, INC., Palo Alto, CA (US)

(72) Inventors: Shaogang Wang, Allison Park, PA (US); Ethan Eade, Pittsburgh, PA (US); Warren Smith, McKees Rocks, PA (US)

(73) Assignee: AURORA INNOVATION, INC., Palo Alto, CA (US)

( * ) Notice: Subject to any disclaimer, the term of this patent is extended or adjusted under 35 U.S.C. 154(b) by 0 days.

(21) Appl. No.: 16/913,518

(22) Filed: Jun. 26, 2020

Related U.S. Application Data

(63) Continuation of application No. 16/732,152, filed on Dec. 31, 2019, now Pat. No. 10,732,261.

(51) Int. Cl.
| | |
|---|---|
| *G01S 7/40* | (2006.01) |
| *G06N 20/00* | (2019.01) |
| *G05D 1/02* | (2020.01) |
| *G06T 7/73* | (2017.01) |
| *G01S 13/86* | (2006.01) |
| *G06T 7/207* | (2017.01) |
| *G01S 13/00* | (2006.01) |

(52) U.S. Cl.
CPC .......... *G01S 7/4026* (2013.01); *G01S 13/867* (2013.01); *G05D 1/0221* (2013.01); *G05D 1/0257* (2013.01); *G06N 20/00* (2019.01); *G06T 7/207* (2017.01); *G06T 7/74* (2017.01); *G01S 2007/403* (2013.01); *G06T 2210/12* (2013.01)

(58) Field of Classification Search
None
See application file for complete search history.

(56) References Cited

U.S. PATENT DOCUMENTS

| | | |
|---|---|---|
| 4,638,445 A | 1/1987 | Mattaboni |
| 4,930,084 A | 5/1990 | Hosaka et al. |
| 5,111,401 A | 5/1992 | Everett et al. |

(Continued)

OTHER PUBLICATIONS

R. Hussain et al, "Autonomous Cars: Research Results, Issues, and Future Challenges"; published in IEEE Communications Surveys & Tutorials; vol. 21, No. 2; second quarter of 2019; pp. 1275-1313; published by IEEE, Piscataway, New Jersey, USA. (Year: 2019).*

*Primary Examiner* — Bernarr E Gregory
(74) *Attorney, Agent, or Firm* — Foley & Lardner LLP

(57) ABSTRACT

A method includes obtaining a first track associated with a first time. A first track associated with a first time is obtained. First predicted state data associated with a second time that is later than the first time, are generated based on the first track. Radar measurement data associated with the second time are obtained from one or more radar sensors. Track data are generated by a machine learning model based on the first predicted state data and the radar measurement data. Second predicted state data associated with the second time are generated based on the first track. A second track associated with the second time is generated based on the track data and the second predicted state data. The second track associated with the second time is provided to an autonomous vehicle control system for autonomous control of a vehicle.

20 Claims, 15 Drawing Sheets

(56) References Cited

U.S. PATENT DOCUMENTS

| | | | |
|---|---|---|---|
| 5,172,253 A | 12/1992 | Lynne | |
| 5,321,614 A | 6/1994 | Ashworth | |
| 5,377,108 A | 12/1994 | Nishio | |
| 5,548,512 A | 8/1996 | Quraishi | |
| 5,555,495 A | 9/1996 | Bell et al. | |
| 5,594,414 A | 1/1997 | Namngani | |
| 5,684,699 A | 11/1997 | Sugiyama | |
| 5,904,215 A | 5/1999 | Ikeda | |
| 6,018,696 A | 1/2000 | Matsuoka et al. | |
| 6,108,597 A | 8/2000 | Kirchner et al. | |
| 7,620,477 B2 | 11/2009 | Bruemmer | |
| 7,822,266 B2 | 10/2010 | Wellington et al. | |
| 8,050,863 B2 | 11/2011 | Trepagnier et al. | |
| 8,457,827 B1 | 6/2013 | Ferguson et al. | |
| 9,349,284 B2 | 5/2016 | Cudak et al. | |
| 9,784,592 B2 | 10/2017 | Gupta et al. | |
| 10,118,610 B2 | 11/2018 | Deng et al. | |
| 10,156,850 B1 | 12/2018 | Ansari et al. | |
| 10,632,942 B1 * | 4/2020 | Christie | G05D 1/0088 |
| 2002/0125050 A1 | 9/2002 | Breed et al. | |
| 2018/0141544 A1 * | 5/2018 | Xiao | G05D 1/0221 |
| 2019/0034794 A1 * | 1/2019 | Ogale | G05D 1/0212 |
| 2019/0318206 A1 * | 10/2019 | Smith | G05D 1/0088 |
| 2020/0200905 A1 * | 6/2020 | Lee | G06T 7/20 |
| 2020/0272160 A1 * | 8/2020 | Djuric | G05D 1/0223 |

* cited by examiner

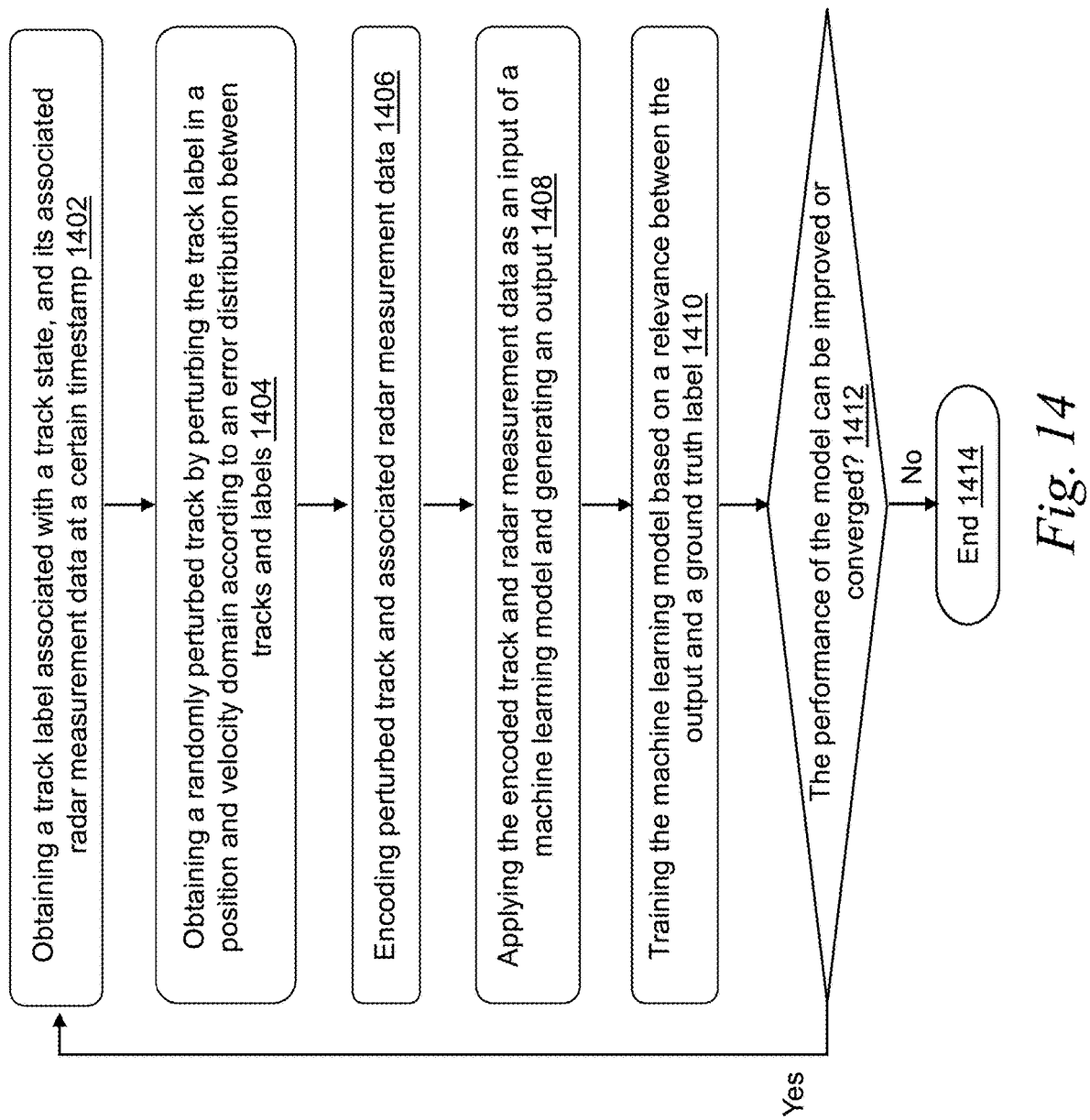

GENERATING DATA USING RADAR OBSERVATION MODEL BASED ON MACHINE LEARNING

CROSS-REFERENCE TO RELATED APPLICATION

The present application is a Continuation of U.S. patent application Ser. No. 16/732,152, filed on Dec. 31, 2019, the entire disclosure of which is incorporated herein by this reference, now issued as U.S. Pat. No. 10,732,261.

BACKGROUND

A fundamental challenge to any autonomous vehicle related technology relates to collecting and interpreting information about a vehicle's surrounding environment, along with planning and executing commands to appropriately control vehicle motion to safely navigate the vehicle through its current environment. For example, measurement data can be captured from one or more sensors of an autonomous vehicle (or a vehicle equipped with autonomous vehicle sensors) and used for tracking and/or identifying dynamic objects within the environment surrounding the vehicle. Improvement in precision of such measurements remains desired. Moreover, when sensors of an autonomous vehicle can obtain measurements at multiple points (e.g., multiple point radar measurements), improvement in efficient processing of multiple points is desired.

SUMMARY

Implementations of the present disclosure relate to a system and a method for training a machine learning (ML) model and generating data using the trained ML model and particularly to a system and a method for training an ML model and generating track data associated with an object using a trained or learned ML model that receives as input radar measurement data from radar sensors and a predicted state associated with the object.

In some implementations according to a first aspect of the present disclosure, a method includes obtaining a first track associated with a first time, The method further includes generating, based on the first track, first predicted state data associated with a second time that is later than the first time. The method further includes obtaining, from one or more radar sensors, radar measurement data associated with the second time. The method further includes based on the first predicted state data and the radar measurement data, generating track data by a machine learning model. The method further includes generating, based on the first track, second predicted state data associated with the second time. The method further includes based on the track data and the second predicted state data, generating a second track associated with the second time. The method further includes providing the second track associated with the second time to an autonomous vehicle control system for autonomous control of a vehicle.

In some implementations according to a second aspect of the present disclosure, a system includes one or more processors and memory operably coupled with the one or more processors. The memory stores instructions that, in response to the execution of the instructions by one or more processors, cause the one or more processors to perform obtaining a first track associated with a first time. The one or more processors are configured to generate, based on the first track, first predicted state data associated with a second time that is later than the first time. The one or more processors are configured to obtain, from one or more radar sensors, radar measurement data associated with the second time. The one or more processors are configured to generate, based on the first predicted state data and the radar measurement data, track data by a machine learning model. The one or more processors are configured to generate, based on the first track, second predicted state data associated with the second time. The one or more processors are configured to generate, based on the track data and the second predicted state data, a second track associated with the second time. The one or more processors are configured to provide the second track associated with the second time to an autonomous vehicle control system for autonomous control of a vehicle.

In some implementations according to a third aspect of the present disclosure, at least one non-transitory computer-readable medium includes instructions that, in response to execution of the instructions by one or more processors, cause one or more processors to perform operations including obtaining a first track associated with a first time. The operations further include based on the first track, generating first predicted state data associated with a second time that is later than the first time. The operations further include obtaining, from one or more radar sensors, radar measurement data associated with the second time. The operations further include based on the first predicted state data and the radar measurement data, generating track data by a machine learning model. The operations further include based on the first track, generating second predicted state data associated with the second time. The operations further include based on the track data and the second predicted state data, generating a second track associated with the second time. The operations further include providing the second track associated with the second time to an autonomous vehicle control system for autonomous control of a vehicle.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 14 is a flowchart illustrating an example methodology for feature extraction and training for a machine learning model according to some implementations.

DETAILED DESCRIPTION

Figure 1:
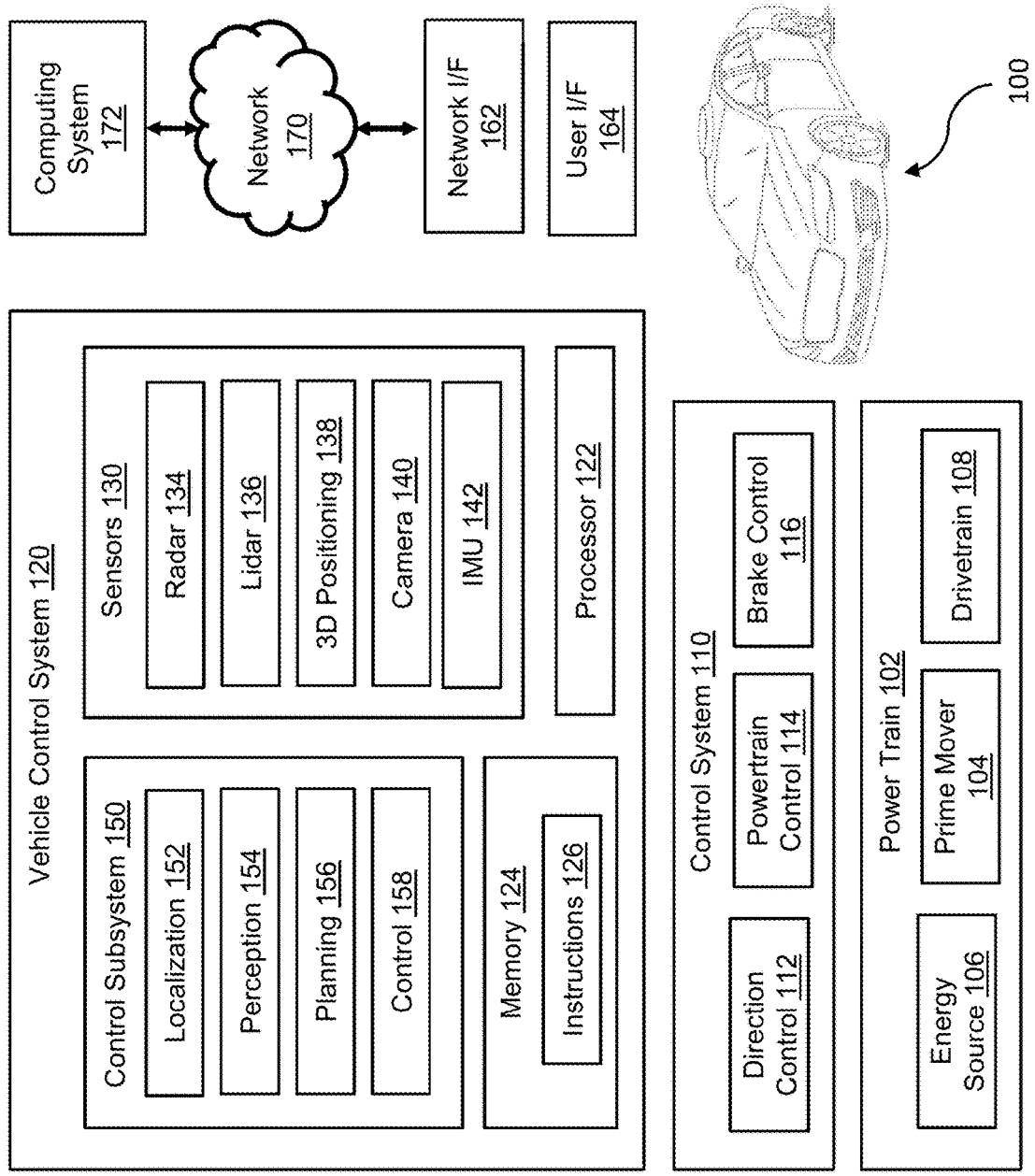
FIG. 1 is a block diagram illustrating an example of a system environment for autonomous vehicles according to some implementations.

According to certain aspects, implementations in the present disclosure relate to techniques for controlling an autonomous vehicle using a trained or learned machine learning (ML) model and training the ML model using training data. More particularly, implementations in the present disclosure relate to a system and a method for training an ML model and generating track data associated with an object using the trained or learned ML model. In some implementations, the trained ML model may receive, as input, (1) radar measurement data from one or more radar sensors and (2) a predicted state associated with the object, and generate and output track data including data representing a particular point of radar measurement associated with the object with improved precision. In some implementations, the trained ML model may generate an output representing a summary of input radar measurements, for example, in the form (or format) of a single radar point. However, the implementations of the present disclosure are not limited to a summary output in the form of a single radar point. In some implementations, the trained ML model may generate a summary output that can convey more information than any single radar point measurement could, for example, a summary output in the form of an idealized or simplified model that can condense or distill the information embedded in (raw) radar measurements, which is different from the form of (raw) radar measurement points.

Radar measurement data captured from one or more radar sensors of an autonomous vehicle (or a vehicle equipped with autonomous vehicle sensors) can be used for tracking and/or identifying dynamic objects within the environment surrounding the vehicle. In this tracking/detecting process, more precise radar measurements are desired. Moreover, when an autonomous vehicle system includes one or more radar sensors that can obtain measurements at multiple points, more simplified and still effective processing of multiple points is desired.

To solve this problem among others, in some implementations, a radar observation model can be trained and used for tracking dynamic objects in the environment surrounding the vehicle. In some implementations, an ML model (e.g., a neural network) can be trained and used as a radar observation model, such that the ML model receives as input (1) radar measurement data from radar sensors, and (2) a prior state associated with the object or a predicted state associated with the object based on the prior state, and generates as output improved track data associated with the object. In some implementations, the radar measurement data associated with an object may be a radar point cloud. In some implementations, the prior state or predicted state associated with the object may be data representing a predicted track (i.e., a course or path that the target object follows) over the object. In some implementations, the improved track data may include data of a single radar point representing the object. In some implementations, a single center point of the object may be output as improved track data from a trained or learned ML model.

The systems and methods described in the present disclosure include several advantages over known systems and methods. First, in some implementations, a light weighted learned radar observation model can be provided, which can utilize small size input and output data. For example, a learned radar observation model according to some implementations can receive data of a predicted track and its associated radar point cloud as input, and output a summary coalescing information about an object state provided by the input or a summary capturing a joint statement about an object state implied by the input data. For example, the summary may be a single point representing the object as a summarized radar point. More particularly, when an autonomous vehicle system includes one or more radar sensors that can measure multiple points, such output of a summary, e.g., a single summarized radar point, can simplify the processing of tracking an object and thus significantly improve the processing performance.

Second, a learned radar observation model according to some implementations can improve precision or accuracy of track data for the purpose of tracking or detecting a target object by utilizing prior knowledge (i.e., a prior state or a predicted state based on the prior state) in a manner similar to a Kalman filtering process. For example, a summary (e.g., a summarized radar point) that is output from the learned radar observation model as a track associated with the target object at a first time point can be used as a prior state associated with the target object to update the track associated with the target object at a second time point later than the first time point. This update process is based on recursive estimation and thus estimated tracks can tend to become more accurate over time.

Third, in some implementations, a tracker using a learned radar observation model can utilize prior knowledge of the target object based on various information about the target object. Examples of such information can be (1) sensor data from radar sensors, (2) sensor data from other sensors (e.g., lidar (Light Detection and Ranging) sensors or cameras), (3) detection data from a detector, (4) previous output data from the radar observation model itself, (5) output data from other models of the tracker, for example, motion models or dynamics models, or (6) output data from the tracker. Using this information, a tracker using the learned radar observation model can improve the accuracy of tracking. More particularly, in a recursive estimation framework that would be difficult to get from a single-shot framework, models such as motion models or dynamic models can be used to obtain motion estimates of a tracked object, thereby allowing the radar observation model to better interpret the information in input radar points.

I. System Environment for Autonomous Vehicles

FIG. 1 is a block diagram illustrating an example of a system environment for autonomous vehicles according to some implementations.

Referring to FIG. 1, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 include wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. The localization subsystem 152 is principally responsible for precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for the vehicle control system 120 is merely exemplary in nature. Individual sensors may be omitted in some implementations. Additionally or alternatively, in some implementations, multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a passenger or an operator, e.g., one or more displays, touchscreens, voice and/or gesture interfaces, buttons and other tactile controls, etc. Otherwise, input from a passenger or an operator may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. In many implementations, data collected by the one or more sensors 130 can be uploaded to a computing system 172 via the network 170 for additional processing. In some implementations, a time stamp can be added to each instance of vehicle data prior to uploading. Additional processing of autonomous vehicle data by computing system 172 in accordance with many implementations is described with respect to FIG. 2, FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The exemplary environment illustrated in FIG. 1 is not intended to limit implementations disclosed herein. Indeed, other alternative hardware and/or software environments may be used without departing from the scope of implementations disclosed herein.

II. Computing Systems for Processing Autonomous Vehicle Data

Figure 2:
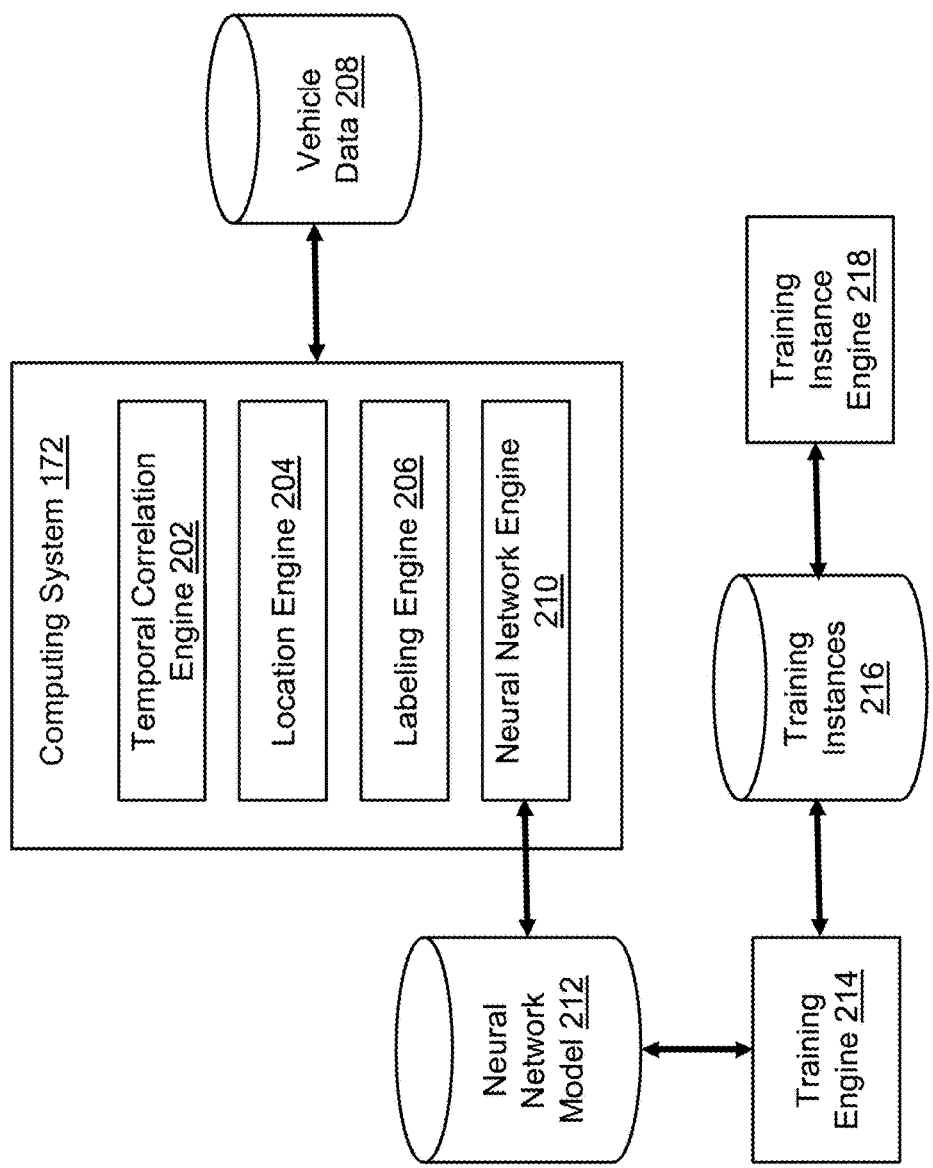
FIG. 2 is a block diagram illustrating an example of a computing system for training a neural network model according to some implementations.

FIG. 2 is a block diagram illustrating an example of a computing system for training a machine learning model such as a neural network model according to some implementations.

The computing system 172 can receive time stamped vehicle observations (i.e., a collection of vehicle data and/or environmental data collected by one or more autonomous vehicle(s) as well as one or more non-autonomous vehicle(s)) via the network 170 (see FIG. 1). In some implementations, computing system 172 may include a temporal correlation engine 202, a location engine 204, a labeling engine 206, a neural network engine 210, a training engine 214, and a training instance engine 218. The temporal correlation engine 202, location engine 204, labeling engine 206, neural network engine 210, training engine 214, and training instance engine 218 are example components in which techniques described herein may be implemented and/or with which systems, components, and techniques described herein may interface. The operations performed by one or more engines 202, 204, 206, 210, 214, 218 of FIG. 2 may be distributed across multiple computing systems. In some implementations, one or more aspects of engines 202, 204, 206, 210, 214, 218 may be combined into a single system and/or one or more aspects may be implemented by the computing system 172. For example, in some of those implementations, aspects of the temporal correlation engine 202 may be combined with aspects of the labeling engine 206. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

The computing system 172 can perform a variety of processing on vehicle data 208. In some implementations, the vehicle data 208 includes time stamped autonomous vehicle data (as described herein with respect to FIG. 1). The temporal correlation engine 202 can (if necessary) synchronize time stamps between sets of data collected by separate vehicles collecting data in the same environment. For example, while two vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

The location engine 204 can determine the proximity of vehicles within the environment (often at each time stamp) from the vehicle data 208. In some implementations, the co-presence of vehicles can be determined using one or more proximity sensors within a vehicle. In some implementations, signals from proximity sensors can indicate a wide variety of ranges including: not in range, within one meter, within five meters, within ten meters, within fifty meters, within one hundred meters, within two hundred meters, etc. In some implementations, only vehicle data where vehicles are within a threshold level of proximity may be further processed (e.g., only data from vehicles within a 250 meter range may be additionally processed).

Additionally or alternatively, vehicles can move in and out of a threshold range of proximity as they maneuver in the environment. For example, only data at time stamps where vehicles are in proximity range can be additionally processed. In some implementations, portions of vehicle data where vehicles are not in proximity can be discarded.

The location engine 204 can additionally or alternatively determine vehicle locations using vehicle data 208 along with high-definition maps built with sensory data, for example. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using lidar data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data (which may be collected using, for example, autonomous vehicle sensor(s) mounted on a non-autonomous vehicle). Data collected by corresponding vehicle lidar units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some implementations, an autonomous vehicle can determine its location on the same map, with respect to the same reference frame, and/or one or more additional methods of determining its location with respect to the same map as the additional vehicle.

The labeling engine 206 can generate labels (in some implementations automatically generate labels) for autonomous vehicle data using vehicle data collected from one or more additional vehicles. In some implementations, the computing system 172 can determine whether two vehicles are co-present in an environment using the location engine 204. In some implementations, the labeling engine 206 can determine instances of autonomous vehicle data which only captures a single additional vehicle co-present in the environment (i.e., when the autonomous vehicle is known to be within a proximity range of an additional vehicle, and only one vehicle is captured in the autonomous vehicle data, generally the additional vehicle will be the vehicle captured in the autonomous vehicle data). In some implementations, the labeling engine 206 can determine instances of autonomous vehicle data which captures additional non-vehicle objects co-present with the current vehicle in the environment. Data collected from the additional vehicle can be mapped to the location of the additional vehicle in the instance of autonomous vehicle data at a common time stamp. For example, a brake light signal of a non-autonomous vehicle (equipped with autonomous vehicle sensors) can be collected via a controller area network (CAN) bus and time stamped by a computing device of the non-autonomous vehicle. A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, the labeling engine 206 can utilize locations of two vehicles determined by location engine 204 (e.g., locations determined using GPS data collected from each vehicle and/or by localizing each vehicle using a common landmark(s) in the environment).

The neural network engine 210 can train a neural network model 212. The neural network model 212, in accordance with some implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, the neural network model 212 can represent a variety of machine learning techniques in addition to neural networks such as support vector machines, decision trees, Bayesian networks, other machine learning techniques, and/or combinations of machine learning techniques. Training the neural network model 212 in accordance with some implementations described herein can utilize the neural network engine 210, training engine 214, and training instance engine 218. Neural network models can be trained for a variety of autonomous vehicle tasks including determining a target autonomous vehicle location, generating one or more signals to control an autonomous vehicle, tracking or identifying objects within the environment of an autonomous vehicle, etc. For example, a neural network model can be trained to identify traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

The training instance engine 218 can generate training instances to train the neural network model. A training instance can include, for example, an instance of autonomous vehicle data where the autonomous vehicle can detect an additional vehicle using one or more sensors and a label corresponding to data collected from the additional vehicle. The training engine 214 may apply a training instance as input to neural network model 212. In some implementations, the neural network model 212 can be trained using at least one of supervised learning, unsupervised learning, or semi-supervised learning. Additionally or alternatively, neural network models in accordance with some implementations can be deep learning networks including recurrent neural networks, convolutional neural networks (CNN), networks that are a combination of multiple networks, etc. For example, the training engine 214 can generate a predicted neural network model output by applying training input to the neural network model 212. Additionally or alternatively, the training engine 214 can compare the predicted neural network model output with a neural network model known output from the training instance and, using the comparison, update one or more weights in the neural network model 212. In some implementations, one or more weights may be updated by backpropagating the difference over the entire neural network model 212.

Figure 3:
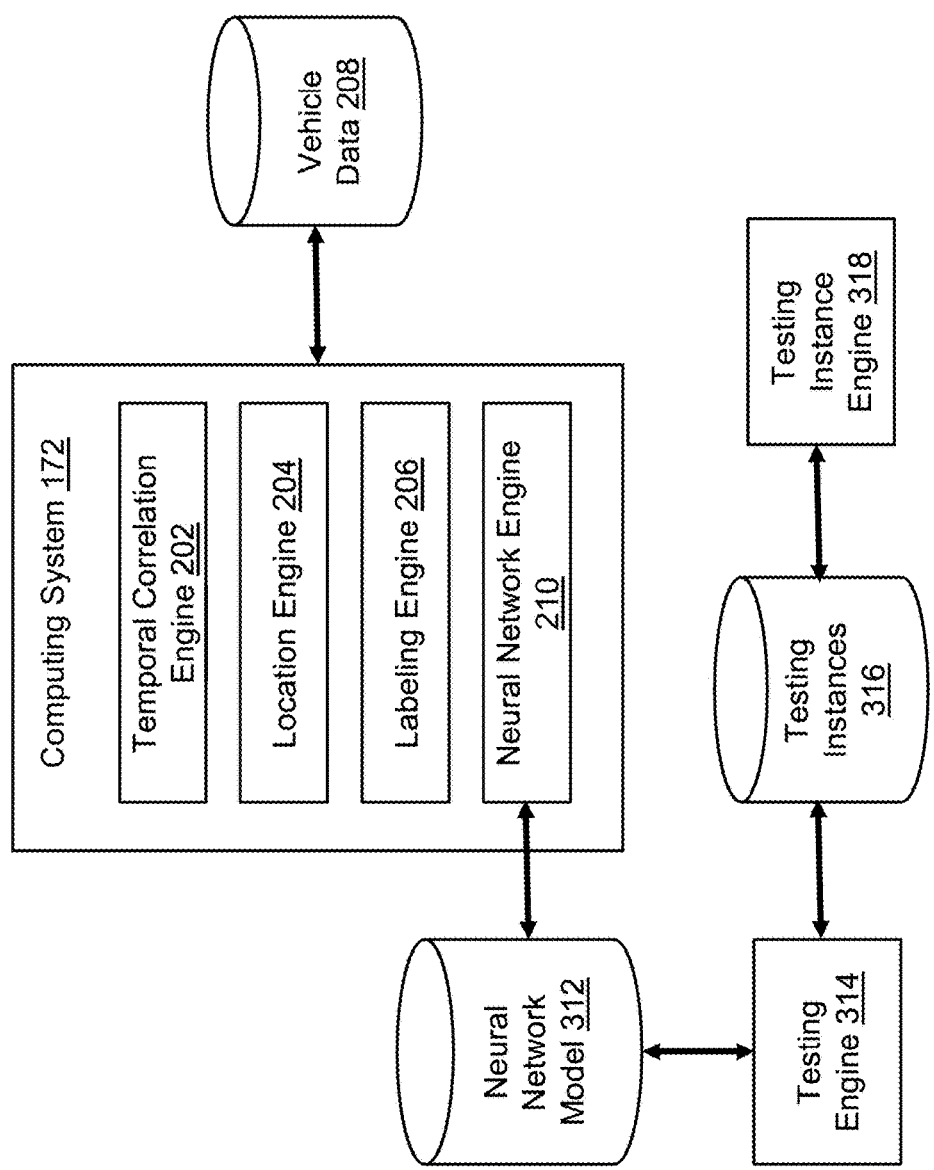
FIG. 3 is a block diagram illustrating an example of a computing system for testing a neural network model according to some implementations.

FIG. 3 is a block diagram illustrating an example of a computing system for testing a trained neural network model according to some implementations. The computing system 172, temporal correlation engine 202, location engine 204, labeling engine 206, and vehicle data 208 are described in the foregoing sections with respect to FIG. 2. The neural network engine 212, testing engine 314, and testing instance engine 318 in accordance with some implementations can be utilized to generate testing instances for autonomous vehicle data including a label corresponding to an additional vehicle or a non-vehicle object present in the autonomous vehicle data, as well as to test a trained (or learned) neural network model 312. In some implementations, the trained neural network model 312 can generate a predicted output for a single autonomous vehicle task. In other implementations, the trained neural network model 312 can generate a predicted output for multiple autonomous vehicle tasks. Testing instance engine 314 can generate testing instances 316 using labeled autonomous vehicle data collected from an autonomous vehicle and an additional vehicle (or a non-vehicle object), performing the specific autonomous vehicle task the neural network model 312 is trained for.

A testing instance, for example, can include an instance of autonomous vehicle data where an additional vehicle (or a non-vehicle object) is detected by one or more sensors of the autonomous vehicle, and a label corresponding to data collected by the additional vehicle. The testing engine 314 can apply a testing instance as input to the neural network model 312. A predicted output generated by applying a testing instance to the neural network model 312 can be compared with a known output for the testing instance (i.e., a label generated by the labeling engine 206) to update an accuracy value (e.g., an accuracy percentage) for the neural network model.

Figure 4:
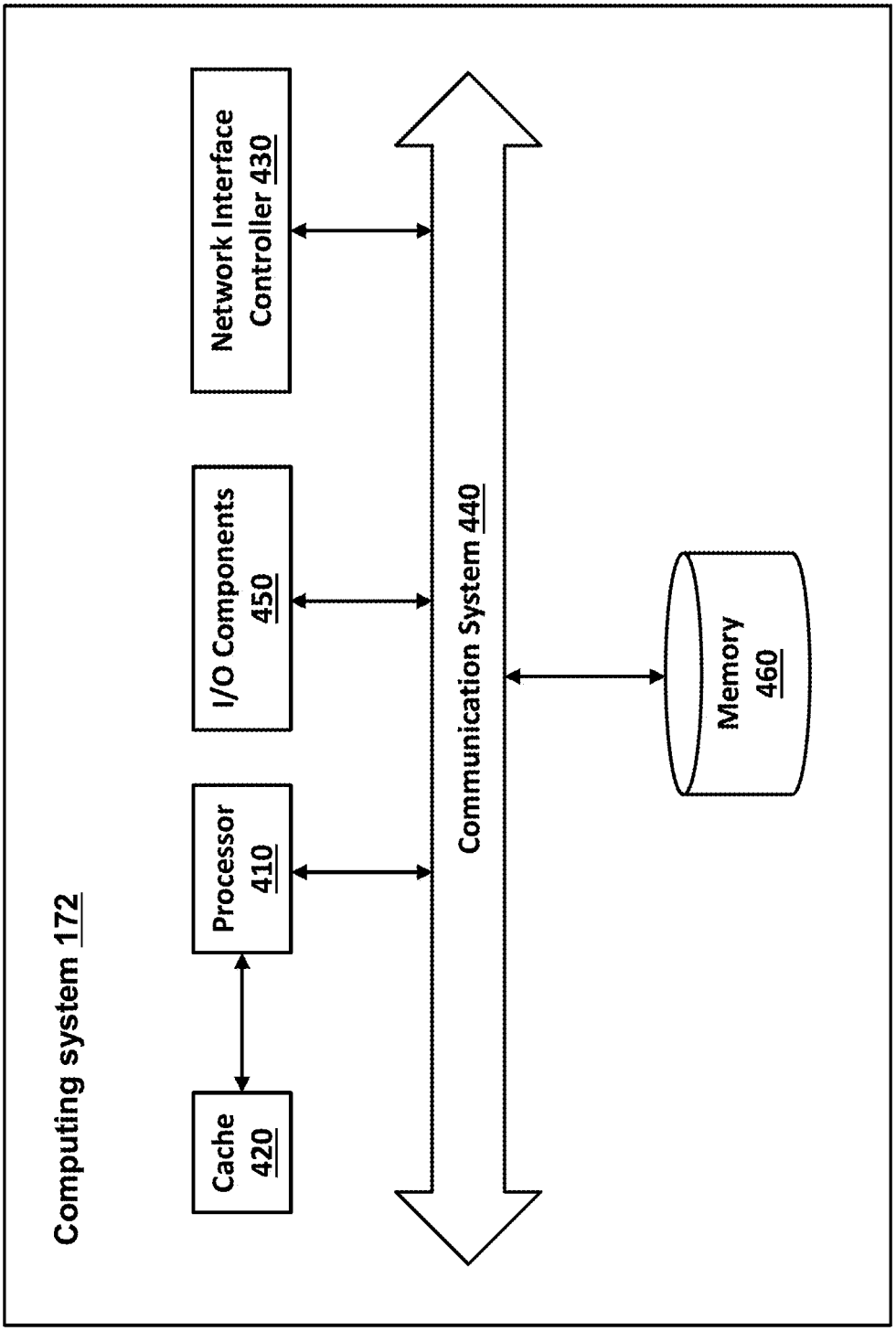
FIG. 4 is a block diagram illustrating an example of a computing system according to some implementations.

FIG. 4 is a block diagram illustrating an example of a computing system according to some implementations.

Referring to FIG. 4, the illustrated example computing system 172 includes one or more processors 410 in communication, via a communication system 440 (e.g., bus), with memory 460, at least one network interface controller 430 with network interface port for connection to a network (not shown), and other components, e.g., an input/output ("I/O") components interface 450 connecting to a display (not illustrated) and an input device (not illustrated). Generally, the processor(s) 410 will execute instructions (or computer programs) received from memory. The processor(s) 410 illustrated incorporate, or are directly connected to, cache memory 420. In some instances, instructions are read from memory 460 into the cache memory 420 and executed by the processor(s) 410 from the cache memory 420.

In more detail, the processor(s) 410 may be any logic circuitry that processes instructions, e.g., instructions fetched from the memory 460 or cache 420. In some implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, a computing system 172 has multiple network interfaces controlled by a single controller 430. In some implementations, a computing system 172 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC"; BLUETOOTH®, a trademark of Bluetooth Sig, Inc.; ANT; or any other wireless protocol). In some implementations, the network interface controller 430 implements one or more network protocols such as Ethernet. Generally, a computing device 172 exchanges data with other computing devices via physical or wireless links through a network interface. The network interface may link directly to another device or to another device via an intermediary device, e.g., a network device such as a hub, a bridge, a switch, or a router, connecting the computing device 172 to a data network such as the Internet.

The computing system 172 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 410 with high precision or complex calculations.

Figure 5:
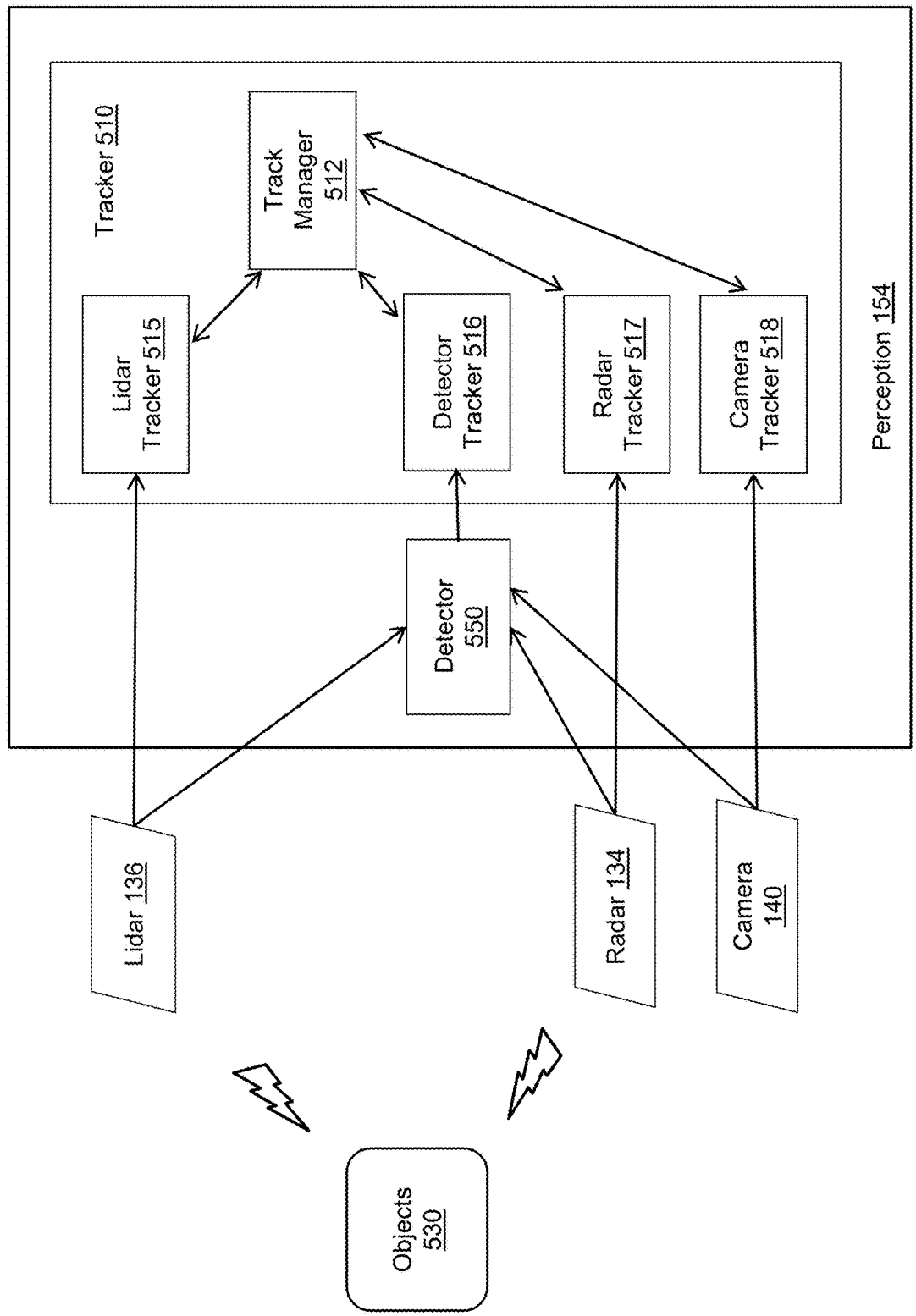
FIG. 5 is a block diagram illustrating an example of a perception subsystem according to some implementations.

III. System and Methods for Generating Data Using Learned Radar Observation Models FIG. 5 is a block diagram illustrating an example of a perception subsystem according to an exemplary implementation of the present disclosure.

The perception subsystem 154 is responsible for detecting, tracking, determining, and/or classifying objects within the environment surrounding the vehicle 100 (see FIG. 1). In some implementations, the perception subsystem 154 may include at least one of a detector 550 (or a plurality of detectors 550) and a tracker 510. In some implementations, the perception subsystem 154 can include multiple detectors that receives sensor data from respective sensors.

The detector 550 is principally responsible for determining and/or detecting objects within the environment surrounding the vehicle based on sensor data received from sensors. In some implementations, the detector 550 may receive data from sensors (e.g., lidar data from the lidar sensor 136 or a plurality of lidar sensors 136, radar data from the radar sensor 134 or a plurality of radar sensors 134) and process the received sensor data to determine and/or detect objects. In some implementations, the detector 550 may be one or more detectors corresponding to respective different kinds of sensors, or a single detector receiving data from different kinds of sensors, or multiple detectors each receiving data from different kinds of sensors. In some implementations, the detector 550 may be configured to classify an object into a particular category based on sensor data received from the one or more sensors (e.g., using one or more machine learning models to classify an object into a particular category). In some implementations, the detector 550 may determine features related to an object based on sensor data. For example, the detector 550 can determine a size, a shape, a velocity, or a moving direction of an object. In some implementations, the detector 550 may output the determined classification or the determined features of an object to be input to the tracker 510.

The tracker 510 is principally responsible for tracking objects (e.g., objects 530) within the environment surrounding the vehicle 100. In some implementations, the tracker 510 may be configured to associate consecutive sensor observations (e.g., radar points in cloud points measured by a radar sensor) of an object and generate a track based on the sensor observations.

In some implementations, the tracker 510 may include a track manager 512 which initiates and/or updates a track associated with the object based on changes of the target objects. In some implementations, the tracker 510 may include a radar tracker 517. In some implementations, where the radar measurement data are encoded in a certain format, the radar tracker 517 can decode and convert radar measurement data (e.g., radar points received from the radar sensor 134 or a plurality of radar sensors 134) into a different format. For example, the radar tracker 517 can add certain channels to the format of the radar measurement data such that additional data can be associated with the additional channels that are included in the different format. In some implementations, the radar tracker 517 determines tracks of different objects (e.g., present position and velocity of different objects), and outputs radar points associated with tracks of different objects to be input to the track manager 512. In some implementations, in response to a request for up-to-date radar measurement data from the track manager 512, the radar tracker 517 may be configured to output track data based on radar points of up-to-date radar measurements, to be input to the track manager 512.

In some implementations, the tracker 510 may include a detector tracker 516 which receives detection data from the detector 550 and outputs data of a track of the newly detected object (e.g., position and velocity data) to be input to the track manager 512. In some implementations, the tracker 510 may include a lidar tracker 515 which converts lidar measurement data (e.g., reflected laser measured by the lidar sensor 136 or a plurality of lidar sensors 136) to points or a surface in a 3D environment, and output the points or surface to be input to the track manager 512. Similarly, the tracker 510 may include a camera tracker 518 which converts images captured by a camera (e.g., the camera 140 or a plurality of cameras 140) to points or a surface in a 3D environment, and output the points or surface to be input to the track manager 512.

Figure 6:
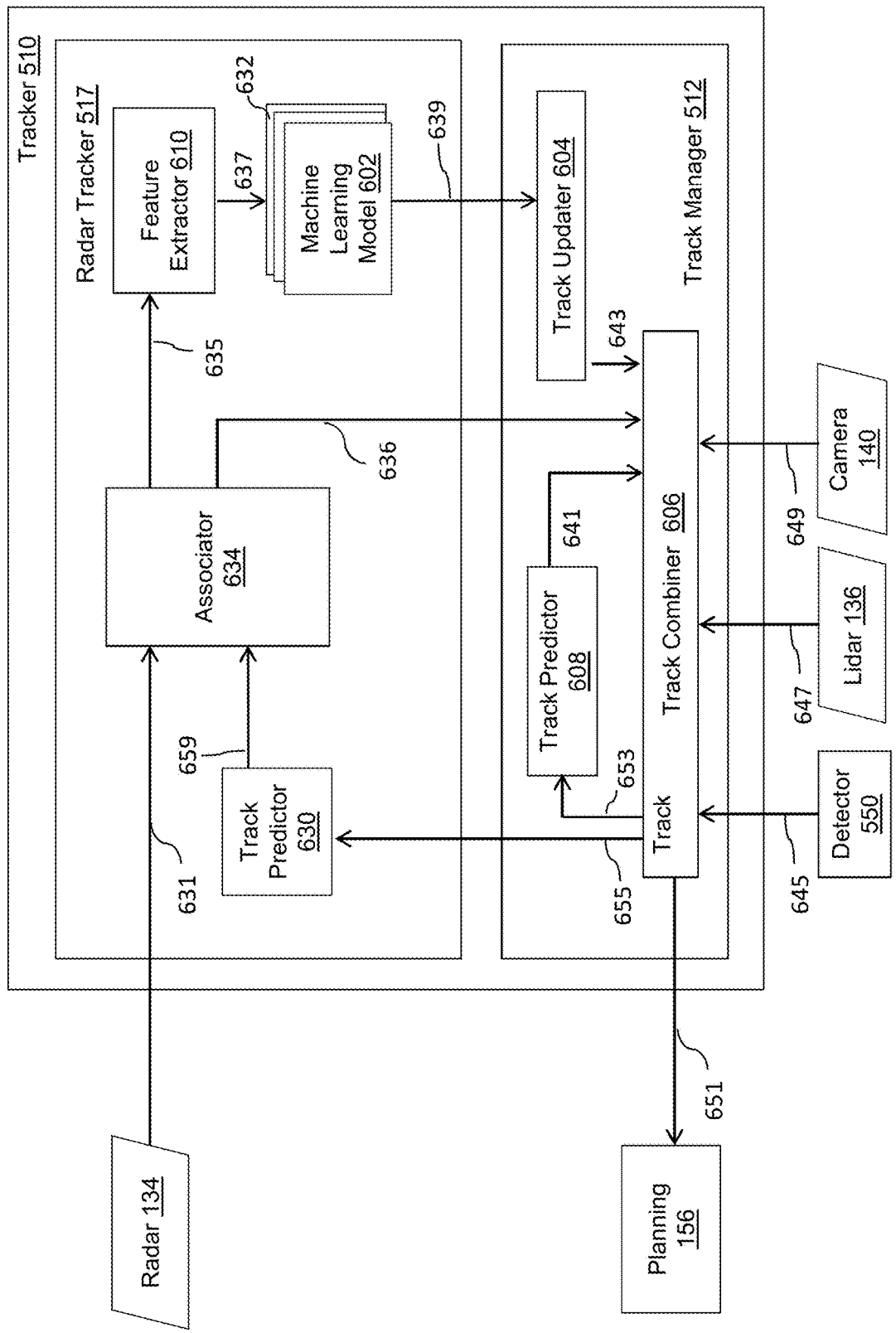
FIG. 6 is a block diagram illustrating an example of a track manager and a radar tracker according to some implementations.

FIG. 6 is a block diagram illustrating an example of a track manager 512 and a radar tracker 517 according to some implementations.

The radar tracker 517 includes a track predictor 630, an associator 634, a feature extractor 610, and a machine learning model 602 (e.g., neural network model). The radar tracker 517 receives sensor data from the radar sensor 134. The sensor data may include radar points 631 that represent one or more objects in an environment at which an autonomous vehicle is located. The received sensor data may be provided to the associator 634 of the radar tracker 517. The associator 634 additionally receives predicted state data 659 from the track predictor 630. The track predictor 630 will be described in greater detail below with reference to the track manager 512.

In some implementations, the track manager 512 may generate a track 655 of an object based on measurement data measured at time $t_1$ (denoted by track $655(t_1)$). The track predictor 630 may receive the track $655(t_1)$ of the object from the track manager 512. For example. the track manager 512 can provide the track $655(t_1)$ to the track predictor 630 as feedback. In some implementations, where the radar tracker 517 receives radar points from the radar sensor 134 for the first time, the track predictor 630 may not receive any track from the track manager 512. Since the track predictor 630 has not received any input from the track manager 512, the track predictor 630 cannot provide any predicted state data to the associator 634. In these implementations, the associator 634 may generate a proposal only based on radar points received from the radar sensor 134. For example, the associator 634 can generate a proposal 636 that represents a track associated with the radar points 631 received from the radar sensor 134 without any predicted state data provided from the track predictor 630. The proposal 636 can be directly provided to the track manager 512 without going through the machine learning model 602.

In some implementations, the radar tracker 517 may receive radar points with measurement timestamp $t_4$ and receive tracks from the track manager 512 at timestamp $t_3$ (e.g., tracks 655 ($t_3$)) where $t_3$ may be earlier or later than $t_4$. In some implementations, in response to determining that timestamp $t_3$ is different from timestamp $t_4$, the track predictor 630 may predict a track state at $t_4$ (e.g., predicted state data 659 ($t_4$)) based on a predefined motion model so that the measurement radar points and the track state can register with the same timestamp. In some implementations, the predefined motion model may be one of the constant velocity (CV) model, the constant acceleration (CA) model, the Constant Steering Angle and Velocity (CSAV) model, the Constant Curvature and Acceleration (CCA) model, the Constant Turn Rate and Velocity (CTRV) model, or the Constant Turn Rate and Acceleration (CTRA) model. Such synchronization of the timestamps between the measurement radar points and the predicted track state can facilitate association steps by the associator 634. For example, the associator 634 may associate measurement radar points with the predicted track state (at $t_4$) such that the associated points along with the associated tracks (e.g., associated data 635, collectively) are pushed through the machine learning model 602, to generate summary points (e.g., track data 639). In some implementations, the feature extractor 610 may generate or form input data of the machine learning model which has been learned or trained. In some implementations, radar points that are not associated with tracks from the track manager 512 ("unassociated points") can be used to generate proposals 636, which feed to the track manager 512.

In some implementations, where the track predictor 630 does not receive any track from the track manager 512, the track predictor 630 can provide particular data as predicted state data 659 to the associator 634. For example, the track predictor 630 can provide the associator 634 with a default predicted state data or any data that can be appropriately used by the associator 634 to generate the proposal 636.

In some implementations, once the proposal 636 is provided to the track manager 512, the track manager 512 may generate a track based on the proposal 636 and/or track data (e.g., data 645, 647, and 649) received from various sources. For example, the track data 645 can be received from the detector 550, the track data 647 can be received from the lidar sensor 136, and the track data 649 can be received from the camera 140. In some implementations, with reference to FIG. 6, these track data 645, 647, and 649 can be received from the detector 550, the lidar sensor 136, and a camera 140 to the track manager 512 directly. In some other implementations, with reference to FIGS. 5 and 6, these track data 645, 647, and 649 can be received from the detector 550, the lidar sensor 136, and a camera 140 to the track manager 512 through the detector tracker 516, the lidar tracker 515, and the camera tracker 518 respectively. However, sources of track data are not limited to the examples described in this paragraph. Instead, any suitable sensors or elements of an AV system that can provide track data used for determining a track can be sources of the track data.

Once the track manager 512 receives the proposal 636 from the radar tracker 517 and track data from other sources, the track manager 512 can generate a track 655 based on the proposal 636 and/or the track data 645, 647, and 649. In some implementations, the track manager 512 may provide the track $655(t_1)$ back to the radar tracker 517 so that the track predictor 630 can generate predicted state data 659 based on the returned track $655(t_1)$. For example, the track predictor 630 can generate predicted state data 659 at time $t_2$ (denoted by $659(t_2)$) based on the returned track $655(t_1)$. In some implementations, the associator 634 may receive (i) radar points 631 of measurement data measured at time $t_2$ (denoted by $631(t_2)$) from the radar sensor 134 and (ii) the predicted state data $659(t_2)$ generated by the track predictor 630. The associator 634 may associate the predicted state data $659(t_2)$ with the radar points $631(t_2)$ and provide associated data 635 to the feature extractor 610.

In some implementations, once the proposal 636 is provided to the track manager 512 and the track manager 512 begins to provide a track (e.g., the track 655) as feedback to the radar tracker 517, the radar tracker 517 may not generate a proposal anymore. Instead, the track manager 512 can generate track data. For example, the track manager 512 can generate track data 639 and provide the track data 639 as track data to the track manager 512. That is, the track manager 512 may generate the proposal 636 as initial track data and, after the generation of the proposal 636, the track manager 512 may generate the track data 639 as an update to the initial track data.

In this manner, if the measurement points are not associated with any track (received from the track manager 512), the radar tracker 517 may propose a new track (to the track manager 512) so that in the next round, when the radars receive measurements from the same target, the measurement points can be associated with the existing track which was proposed in the last round. In this manner, instead of proposing a new track again, the radar tracker 517 can generate updates which can be used by the track manager 512 to update the associated track (e.g., by the track updater 604 in FIG. 6).

In some implementations, the radar tracker 517 may be configured to generate the track data 639 using a machine learning model 602. The radar tracker 517 may be configured to output track data (denoted by $639(t_2)$) based on radar points $631(t_2)$. The track data $639(t_2)$ may be input to the track manager 512. For example, the track data $639(t_2)$ may be input to the track updater 604 of the track manager 512 (see FIG. 6).

In some implementations, the radar tracker 517 may be configured to receive radar points from the radar sensor 134 without sending a request to the radar sensor 134. For example, the radar tracker 517 can periodically receive radar points from the radar sensor 134. As another example, the radar tracker 517 can receive radar points from the radar sensor 134 whenever there are any radar points generated by the radar sensor 134. In some implementations, the radar tracker 517 may be configured to send a request to the radar sensor 134 for radar points of up-to-date radar measurements. In response to the request from the radar tracker 517, the radar sensor 134 may be configured to send up-to-date radar points (e.g., $631(t_2)$) to the radar tracker 517.

In some implementations, the track predictor 630 may receive track data $655(t_1)$ from the track manager 512, determine or estimate a track of an object at time $t_2$ based on the track $655(t_1)$ and a predefined motion model of the object, for example, and output track data (as predicted state data $659(t_2)$) of the determined track of the object to be input to the associator 634. In some implementations, the track predictor 630 may determine or estimate the track of the object at time $t_2$ based on a time difference between time $t_1$ and time $t_2$. The predicted state data $659(t_2)$ of the determined track of the object may include predicted position information of the track of the object at time $t_2$ (e.g., predicted position and velocity information at time $t_2$). In some implementations, from the track $655(t_1)$, the track predictor 630 may be configured to obtain a measurement time of the track $655(t_1)$ and predicted position of the track at time $t_2$ by using a motion model based on a time difference between time $t_1$ and the time $t_2$.

In some implementations, the motion model is at least one of the constant velocity (CV) model, the constant acceleration (CA) model, the Constant Steering Angle and Velocity (CSAV) model, the Constant Curvature and Acceleration (CCA) model, the Constant Turn Rate and Velocity (CTRV) model, or the Constant Turn Rate and Acceleration (CTRA) model, or any other motion models. In some implementations, the track predictor 630 may be configured to generate predicted state data of the track (e.g., predicted state data 659) for use in the machine learning model 602. In some implementations, the predicted state data 659 may include predicted position information of the track at the time $t_2$, based on which predicted bounding box of the track (e.g., a predicted bounding box 710 in FIG. 7 or a predicted bounding box 900 in FIG. 9) can be rendered.

In some implementations, the associator 634 may receive (1) the radar points 631 of up-to-date measurement data (e.g., $631(t_2)$) and (2) the predicted state data 659 of the predicted track of the object (e.g., $659(t_2)$). The associator 634 may generate associated data 635 (denoted by $635(t_2)$) based on the radar points $631(t_2)$ and the predicted state data $659(t_2)$. In some implementations, the associated data 635 may include radar points which are associated with the object of the track 655 received from the track manager 512. In some implementations, the associator 634 may associate the radar points $631(t_2)$ with the predicted state data $659(t_2)$ of the predicted track of the object. Based on the association of the radar points $631(t_2)$ with the predicted state data $659(t_2)$, the associator 634 can generate the associated data $635(t_2)$. For example, the associator 634 can determine particular radar points from the radar points 631 based on the predicted state data 659 of the predicted track of the object. In this example, the associator 634 can selectively extract associated radar points from the radar points 631 based on the predicted state data 659 of the predicted track of the object.

In some implementations, the associator 634 may generate, as portion of the associated data $635(t_2)$, updated track data of the object at time $t_2$, by updating the track $655(t_1)$ based on the radar points $631(t_2)$ and the predicted state data $659(t_2)$ of the predicted track of the object. In some implementations, the associator 634 may be configured to generate the associated data 635 by sampling radar points (e.g., radar points 631 received from the radar sensor 134) and associating the sampled radar points with a predicted bounding box of the track (e.g., a bounding box 710 in FIG. 7). In these implementations, the predicted bounding box of the track can be received from the track predictor 630 as the predicted state data. The associated data 635 can be provided to the feature extractor 610 so that the feature extractor 610 can encode the radar points sampled along each side of the predicted bounding box into feature vectors (e.g., as feature data 637). In some implementations, at least one of the feature vectors has a fixed length and indices of a vector represent azimuth angle bins so that the feature vector represents an azimuth field of view (FoV) of a radar sensor.

In some implementations, the associator 634 may be configured to determine that (1) the radar points 631 of up-to-date measurement data and (2) the predicted state data 659 of the predicted track of the object are not associated. In some implementations, the associator 634 may determine failure of associating (1) the radar points 631 and (2) the predicted state data 659 by determining that position information of the two data are not matched, for example. In response to a determination of failure of associating (1) the radar points 631 and (2) the predicted state data 659, the associator 634 may be configured to generate a proposal 636 that represents a new track. The new track can be provided to the track manager 512. In some implementations, the track manager 512 can store the new track and update the new track with track updates (e.g., track data 639). In some implementations, the track data 639 may include a vector including a plurality of azimuth angle bins, where one of which indicates a center point of a new track (e.g., the center point 740 of the bounding box 720 in FIG. 7). In some implementations, in addition to an output of a single point representing the new track, the track data 639 may include additional information associated with the single point, e.g., range and range rate of the radar at the single point (see FIG. 10).

In some implementations, the radar tracker 517 may include the feature extractor 610 which receives the associated data 635 from the associator 634 and generates, from the associated data 635, feature data 637. For example, the feature extractor 610 can encode the received associated data 630 to generate the feature data 637. In this example, the feature data 637 can be provided to the machine learning model 602. In some implementations, the feature data may include information on at least one of range, azimuth, range rate, intensity, order statistics of range, range rate or intensity, or any combination thereof. In some implementations, the order statistics include, but are not limited to, a maximum range, a minimum range, a maximum range rate, a minimum range rate, a maximum intensity, a minimum intensity. In some implementations, the feature extractor 610 may encode feature data into feature vectors. In some implementations, a feature vector has a particular length. In these implementations, indices of the feature vector can represent azimuth angle bins so that the feature vector represents an azimuth FoV of the radar (see FIG. 8).

In some implementations, the machine learning model 602 may be a trained or learned machine learning model that receives, as input, feature data (e.g., the feature data 637) generated from the associated data 635. In some implementations, the associated data 635 may be generated by the associator 634 based on at least one of (1) up-to-date radar measurement data (e.g., the radar points 631 of up-to-date measurement data) or (2) a predicted state associated with the object based on a prior state of a track (e.g., the predicted state data $659(t_2)$ of the predicted track of the object based on the track $655(t_1)$).

In some implementations, the machine learning model 602 may be configured to generate track data including a single point of radar measurement data. For example, the single point can represent a track of the object (e.g., the track data 639 in FIG. 6) for use in the track manager 512. In some implementations, the track data 639 may include a vector including a plurality of azimuth angle bins, where one of which indicates a center point of the track with improved precision (see FIG. 10).

In some implementations, in addition to a single point representing the track, the machine learning model 602 may be configured to output additional information associated with the single point, e.g., range and range rate of the radar at the single point. In this configuration, the machine learning model 602 can receive as input (1) feature data extracted from radar measurement data that may include multiple points associated with different objects (e.g., the radar points $631(t_2)$ of up-to-date measurement data) and/or (2) feature data extracted from a track (e.g., the predicted state data $659(t_2)$ of a predicted track of the object based on the track $655(t_1)$). Then, the machine learning model 602 cancan generate precise points associated with the target object based on the prior knowledge (e.g., the predicted state data $659(t_2)$ of the predicted track of the object based on an existing track $655(t_1)$). By using these precise points, the accuracy of detecting and tracking an object can be improved such that a vehicle control system (e.g., the vehicle control system 120) can control an autonomous vehicle (e.g., the autonomous vehicle 100) precisely. Moreover, this enables a vehicle control system (e.g., the vehicle control system 120) to use fewer points for processing such that the vehicle control system can use less computing resources to detect and track objects. In particular, where a vehicle control system is operated based on a limited power source such as a battery, the power consumption can be reduced because the vehicle control system uses less computing resources. Thus, the vehicle control system can be operated longer.

In some implementations, the machine learning model 602 may be trained or learned by the neural network engine 210 (see FIG. 2). In some implementations, the machine learning model 602 may be stored as the neural network model 212 (see FIG. 2) and trained by the neural network engine 210, and moved to the perception subsystem 154 when the training is completed. The machine learning model 602, in accordance with some implementations, may include a layer and/or layers of memory units where memory units each have corresponding weights. Similar to the neural network model 212 (see FIG. 2), a variety of neural network models may be utilized including feed forward neural networks, convolutional neural networks, recurrent neural networks, radial basis functions, other neural network models, as well as combinations of several neural networks. The training the machine learning model 602 in accordance with some implementations may utilize the neural network engine 210, training engine 214, and training instance engine 218 in a similar manner to that of training the neural network model 212. For example, the training instance engine 218 may generate training instances to train the machine learning model 602 by generating feature data similar to the data and predicted state data similar to the data as input vectors to the machine learning model 602. In some implementations, the labeling engine 206 may generate labels indicating ground-truth track data using vehicle data collected and stored in the vehicle data 208.

In some implementations, the machine learning model 602 may be trained using at least one of supervised learning, unsupervised learning, or semi-supervised learning. In some implementations, the machine learning model 602 may be deep learning networks including recurrent neural networks, convolutional neural networks (CNN), networks that are a combination of multiple networks, etc. For example, the training engine 214 can generate a predicted neural network model output (e.g., track data 639 including a single point of radar measurement data associated with a track of the object with improved precision; see FIG. 6) by applying training input to the machine learning model 602. In some implementations, the training engine 214 can compare the predicted neural network model output with a neural network model known output from the training instance (e.g., ground-truth track data generated by the labeling engine 206) and, using the comparison, update one or more weights in the machine learning model 602. In some implementations, one or more weights may be updated by backpropagating the difference over the entire machine learning model 602.

In some implementations, when the training of the machine learning model 602 is completed, the trained machine learning model 602 may be tested in a manner similar to that of testing the trained neural network 312 (see FIG. 3) using the testing engine 314, and testing instance engine 318. In some implementations, the machine learning model 602 may be stored as the neural network model 312 (see FIG. 3) and tested by the trained neural network 312, and moved to the perception subsystem 154 when the training is completed.

In some implementations, the learned machine learning model 602 may include a plurality of learned machine learning (ML) models 632. The plurality of learned ML models may be a variety of neural network models including feed forward neural networks, convolutional neural networks, recurrent neural networks, radial basis functions, other neural network models, as well as combinations of several neural networks. In some implementations, the plurality of learned ML models may represent a variety of machine learning techniques in addition to neural networks, such as support vector machines, decision trees, Bayesian networks, other machine learning techniques, and/or combinations of machine learning techniques. In some implementations, the plurality of learned ML models may receive different feature data as input and output different output vectors, from each other. In some implementations, the track manager 512 may select one of the learned ML models based on properties of the target object (e.g., object category classified by the detector 550) and use the selected model to update the track of the target object.

In some implementations, the track manager 512 may be configured to receive track data of a track of a newly detected target object from various sources. For example, the track manager 512 can receive track data from the radar tracker 517, the detector 550 through the detector tracker 516, the lidar sensor 136, the camera 140, and the radar sensor 134. In some implementations, in response to the track manager 512 receiving measurement data from the radar tracker 517, the track manager 512 may update the track based on (1) prior knowledge about a track (i.e., a prior state of the track or a predicted state based on the prior state) and (2) measurement data received from the radar tracker 517.

Referring to FIG. 5, in some implementations, the track manager 512 may store track data of a plurality of tracks of different objects in a memory, e.g., the memory 124 in FIG. 1. In some implementations, the track manager 512 can store track data in a cloud system and read track data from the cloud system. In particular, track data can be stored and read in real time. The track manager 512 may add new track data to the memory when receiving new track data of a newly detected object from various sources. For example, the track manager 512 can receive new track data from the radar tracker 517 (e.g., via the proposal 636), the detector 550 through the detector tracker 516, the lidar sensor 136 through the lidar tracker 515, or the camera 140 through the camera tracker 518. In some implementations, track data may include position information of a track of a target object at a measurement time, based on which bounding box of the track can be rendered (e.g., bounding boxes 710, 720 in FIG. 7). In some implementations, the position information of a track of the target object may include position information of one or more corners of a bounding box of the track. For example, the position information of a track can include position information of four corners of a bounding box (e.g., four corners 1-4 of a bounding box 900 in FIG. 9A). As another example, the position information of a track can include position information of a particular corner that is the closest to the vehicle 100. In some implementations, in addition to position and time of the track, track data may include other information such as at least one of position and amplitude of the radar, velocity of the object (e.g., a velocity indicated by the arrow 730 in FIG. 7), Doppler velocity measurements (e.g., measurements of range rates), smoothed position and velocity information, predicted position and velocity information at the time of the next scan, or track firmness (i.e., a measure of detection quality).

Referring to FIG. 6, the track manager 512 may update a track of an object based on track data (e.g., the track data 639($t_2$)) and generate an updated track (e.g., tracks 651($t_2$), 653($t_2$), 655($t_2$)). In some implementations, the track manager 512 may generate the updated track 651($t_2$) and provide the updated track 651($t_2$) to the planning subsystem 156 such that the planning subsystem 156 can generate a trajectory based on the updated track 651($t_2$). In some implementations, the track manager 512 may generate the updated track 655($t_2$) and provide the updated track 655($t_2$) to the radar tracker 517 as feedback such that the radar tracker 517 can receive new radar measurements (e.g., radar points 631($t_3$), time $t_3$>time $t_2$) and use the track 655($t_2$) with the radar points 631($t_3$) to generate predicted state data 659($t_3$).

In some implementations, the track manager 512 may include a Kalman filter. The track manager 512 including a Kalman filter can receive track data (e.g., track data 639($t_1$)) as input and generate estimates of a track at time $t_2$. The track manager 512 can additionally receive track data (e.g., track data 639($t_2$)) and generate a track at time $t_2$ (e.g., tracks 651($t_2$), 653($t_2$), 655($t_2$)) by updating the estimates of a track at time $t_2$ with the track data 639($t_2$). In some implementations, the Kalman filter algorithm is recursive so that the estimates of the track may be updated periodically. In some implementations, the Kalman filter algorithm is non-responsive (e.g., placing no weight on most recent measurements) so that the estimates of the track may be updated based on one or more particular features of the algorithm. Example processes for generating a track by the track manager 512 are described in greater detail below.

With reference to FIG. 6, the track manager 512 may include a track updater 604, a track predictor 608, and a track combiner 606. In some implementations, the track updater 604 can receive track updates for time t (denoted by track data 639($t$)) and provide the track updates for time t to the track combiner 606. Additionally, the track predictor 608 can generate predicted state data for time t (denoted by predicted state data 641($t$)) and provide the predicted state data for time t to the track combiner 606 (Other example processes of generating predicted state data by the track predictor 608 are described in greater detail below). Based on the predicted state data 641($t$) and the track updates 639($t$), the track combiner 606 can generate a track for time t (e.g., track 651($t$), track 653($t$), track 655($t$)). The track combiner 606 can provide the track 651($t$) to the planning subsystem 156 as output. Additionally, the track combiner 606 can provide the track for time t (e.g., track 653($t$)) to the track predictor 608 such that the track predictor 608 can generate an estimated track for time t+Δt using the track 653($t$). Additionally, the track combiner 606 can provide the track for time t (e.g., track 655($t$)) to the track predictor 630 of the radar tracker 512 as feedback such that the track predictor 630 can generate predicted state data for time t+Δt (denoted by predicted state data 659($t$+Δt)).

Subsequently, when the radar tracker 517 receives radar points at time t+Δt (denoted by radar points 631($t$+Δt)), the associator 634 can associate the received radar points with the predicted state data 659($t$+Δt) and provide the associated data (denoted by associated data 635($t$+Δt)) to the feature extractor 610. As described above, the feature extractor 610 can encode the associated data 635($t$+t)) and provide the encoded data (denoted by feature data 637($t$+Δt)) to the machine learning model 602. Based on this input, the machine learning model 602 can generate track updates for time t+Δt (denoted by track data 639($t$+Δt)) and provide the track data 639($t$+Δt) to the track manager 512. Examples of the track updates are described in greater detail below.

In some implementations, the track updater 604 can receive the track data 639($t$+Δt) and update the tracker combiner 606 with the track data 639($t$+Δt). As described above, the track predictor 608 can receive the track for time t (e.g., track 653($t$)) from the track combiner 606 and generate the predicted state data for time t+Δt (e.g., predicted state data 653($t$+Δt)) based on the track 653($t$). Based on the predicted state data 653($t$+Δt)) and the track data 639($t$+Δt) as track updates, the track combiner 606 can generate a track for time t+Δt (e.g., track 651($t$+Δt), track 653($t$+Δt), track 655($t$+Δt)). In some implementations, by repeating these processes, the track manager 512 can generate a new track (e.g., track 651($t_2$), track 653($t_2$), track 655($t_2$)) by updating a previous track (e.g., track 651($t_1$), track 653($t_1$), track 655($t_1$)) with new radar measurement data (e.g., radar points 631($t_2$)).

In some implementations, from the track data of the existing track (e.g., track 651, track 653, track 655), the track predictor 608 may be configured to obtain a measurement time (or a most recent update time) of the existing track (e.g., time $t_1$), and predict a track or position of the existing track at time $t_2$ by using a motion model based on the difference between time $t_1$ and time $t_2$.

In some implementations, the motion model is at least one of the constant velocity (CV) model, the constant acceleration (CA) model, the Constant Steering Angle and Velocity (CSAV) model, Constant Curvature and Acceleration (CCA) model, the Constant Turn Rate and Velocity (CTRV) model, or the Constant Turn Rate and Acceleration (CTRA) model, or any other motion models. In some implementation, predicted state data may include predicted position information of the existing track at time $t_2$, based on which a predicted bounding box of the track (e.g., a predicted bounding box 710 in FIG. 7 or a predicted bounding box 900 in FIG. 9) can be rendered.

In some implementations, the track predictor 608 may be configured to generate the predicted state data of the track based on sensor data other than radar measurement data received from the radar tracker 517. For example, position information of the target object as the predicted state data of the track of the target object can be generated based on points or a surface in a 3D environment, received from the lidar tracker 515 or the camera tracker 518 (see FIG. 5). With this configuration, where the target object is near the autonomous vehicle, even before the tack manager 512 receives track data based on up-to-date radar measurement data (e.g., from the radar tracker 517), the track manager 512 can determine that the object is near the autonomous vehicle based on other sensor data (e.g., lidar measurement data).

In some implementations, referring to FIG. 5 and FIG. 6, the track predictor 608 of the track manager 512 may be configured to generate the predicted state data of the track based on detection data from the detector 550. For example, the detector 550 can detect new objects as well as existing objects. In some implementations, the track predictor 608 may receive track data of existing objects from the detector tracker 516 and generate the predicted state data of the existing objects based on the received track data. For example, the track predictor 608 may send a request for track data of a particular object with a description of category and position of the particular object to the detector tracker 516 (see FIG. 5), and in response to the request, the detector tracker 516 may identify and send the particular object to the track predictor 608.

In some implementations, the track predictor 608 may be configured to generate the predicted state data of the track based on previous output data from the radar observation model itself. In some implementations, previous output data (e.g., track data 639) from the machine learning model 602 may be track data including a single point of radar measurement data, where the single point represents a track of the target object. For example, this single point representing the track of the target object may be used to generate the predicted state of data of the same track by calculating a predicted single point of the same track using a difference between measurement times.

In some implementations, the track predictor 608 may be configured to generate the predicted state data of the track based on output data from other models of the tracker, if any. In some implementations, the tracker may have a plurality of learned machine learning (ML) models (e.g., a plurality of learned ML models 632 in FIG. 6), each receiving different feature data as input and outputting different output vectors. In some implementations, the track predictor 608 may select one of the learned ML models based on properties of the target object (e.g., object category classified by the detector 550) and use the output vectors of the selected model associated with the track to generate the predicted state data of the track. In some implementations, the track predictor 608 may apply radar measurement data associated with the target object at time $t_1$ as training input to a selected one of the learned ML models 632 and include the output from the selected model in predicted state data 641 of the track.

In some implementations, the track predictor 608 may be configured to generate the predicted state data of the track based on output data from the tracker 510 (e.g., output track 651, 653, 655 from the track combiner 606). In some implementations, output track data from the tracker 510 may be track data which may include at least one of position and amplitude of the radar, velocity of the object, Doppler velocity measurements (measurements of range rates), smoothed position and velocity information, predicted position and velocity information at the time of the next scan, or track firmness (i.e., a measure of detection quality). In some implementations, the track predictor 608 may use such track data (as output data from the tracker) to generate the predicted state data of the track.

As described above, various techniques can be used to generate the predicted state data of the existing track. However, implementations of the present disclosure are not limited thereto and any data available to the track predictor 608 can be used.

In some implementations, the output of the radar tracker 517 (e.g., the track data 639) may include a single point of radar measurement data associated with an up-to-date track of the object. In some implementations, the track updater 604 may receive the track data 639 and output up-to-date position information based on the track data 639 to be input to the track combiner 606 (e.g., output track data 643 in FIG. 6). For example, in response to receiving the output (e.g., the track data 639) from the machine learning model 602, e.g., track data including a center point of radar measurement data associated with the up-to-date track of the object, the track combiner 606 may update the predicted state data of the predicted track (e.g., the predicted state data 641($t+\Delta t$)) with the up-to-date position information (e.g., the track data 643($t+\Delta t$)).

In some implementations, as described above with reference to the Kalman filter algorithm, the track combiner 606 can combine track data of an existing track (e.g., track data 643) with new track data of a newly detected object (e.g., proposal 636) received from the radar tracker 517. The track combiner 606 may receive new track data including newly detected objects, from various sources (e.g., the detector 550, the lidar sensor 136, the camera 140, or any combination of thereof). In some implementations, the track combiner 606 may generate combined track data (e.g., track 653) to be input to the track predictor 608 or combined track (e.g., track 655) to be input to the track predictor 630. In some implementations, the track 653 and the track 655 can be the same data. In some implementations, the track 653 and the track 655 can be different. For example, the track 653 and the track 655 can have different formats for the respective track predictors 608, 630. In some implementations, the track combiner 606 may output combined track data (e.g., track data 651) to be input to the planning subsystem 156 so that the planning subsystem 156 can generate a trajectory for an autonomous vehicle (e.g., the vehicle 100 in FIG. 1) based on one or more tracks of objects within the environment.

An example track processing using the systems illustrated in FIG. 1 to FIG. 6 will be described with reference to FIG. 7 to FIG. 10.

Figure 7:
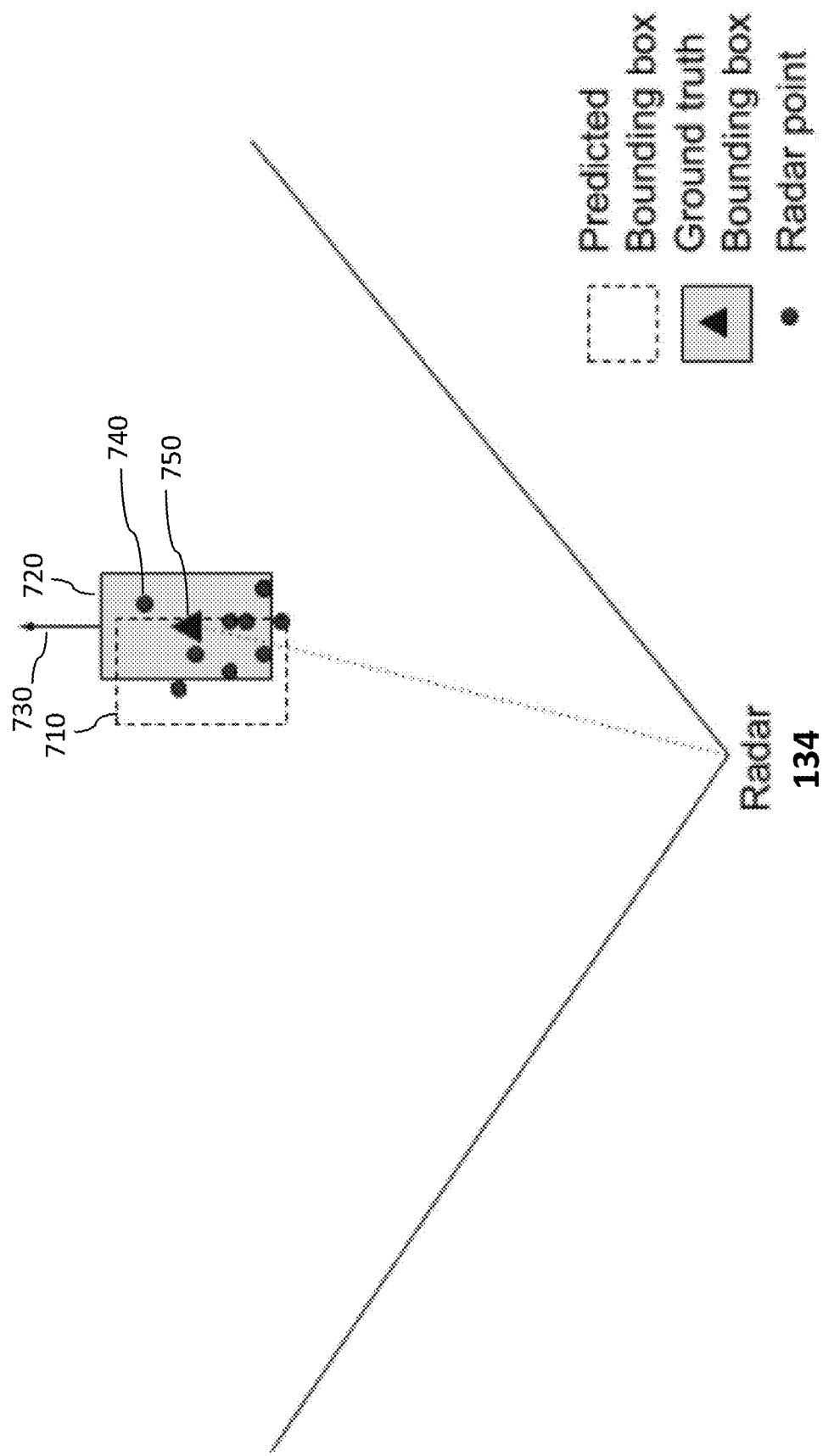
FIG. 7 is a block diagram illustrating an example setup for processing tracks according to some implementations.

FIG. 7 is a block diagram illustrating an example setup for processing tracks according to an exemplary implementation. In some implementations, the radar sensor 134 may process each radar frame separately and send radar points (e.g., radar points 631 in FIG. 6, radar points 740 in FIG. 7) to the feature extractor 610 (via the associator 634). In some implementations, the feature extractor 610 may generate feature data based on the radar points. The track predictor 630 may generate predicted track data of the existing track (e.g., predicted state data 659) as indicated by the predicted bounding box 710 in FIG. 7. The feature data (as radar observation) and the predicted state (as prior knowledge) can then be encoded and fed into an observation model (e.g., the machine learning model 602). The machine learning model 602 may associate radar points to a track of the target object based on the predicted state of the existing track and generate a summary (e.g., the triangle 750 in FIG. 7 as a summarized point) of a ground truth bounding box 720 (which has velocity 730) as output. The summarized point 750 may represent the center of the up-to-date track at the current measurement time (e.g., time $t_2$). Such a summary may be used to update the predicted track of the target object (e.g., the predicted state data 641) via the track updater 604.

In some implementations, the machine learning model 602 (see FIG. 6) may be trained by the training engine 214 (see FIG. 2) to be a learned neural network model. In some implementations, input training data may be radar measurement data from radar sensors (e.g., the feature data 637 in FIG. 6) and prior knowledge about a target object (e.g., the predicted state data 659 in FIG. 6). In some implementations, the prior knowledge may be generated based on a motion model and previous position of the target object. In some implementations, the prior knowledge may be generated based on sensor data other than radar measurement data, e.g., lidar sensor data. In some implementations, output training data may be ideal track data (e.g., track data including an estimated center point of a ground truth track of the target object). In some implementations, at training, the machine learning model 602 may evaluate the estimated center point by comparing it to a center point in labeled data. The labeled data may be generated by the labeling engine 206 (see FIG. 2). In some implementations, data of noisy tracks may be generated as input/output training samples by perturbing the position, speed, and heading of track states of labels. In some implementations, data of noisy tracks and the associated radar points may be provided as input/output training samples. The labels may be converted to a predetermined output format (see FIG. 10), e.g., a weight vector representing a Gaussian distribution centered at the ground truth azimuth bin. The range and range rate vectors (see FIG. 10) may have ground truth values at all bins thereof. In some implementations, the training engine 214 may use a loss function to evaluate how well the machine learning model 602 fits the given training samples so that the weights of the model can be updated to reduce the loss on the next evaluation.

Figure 8:
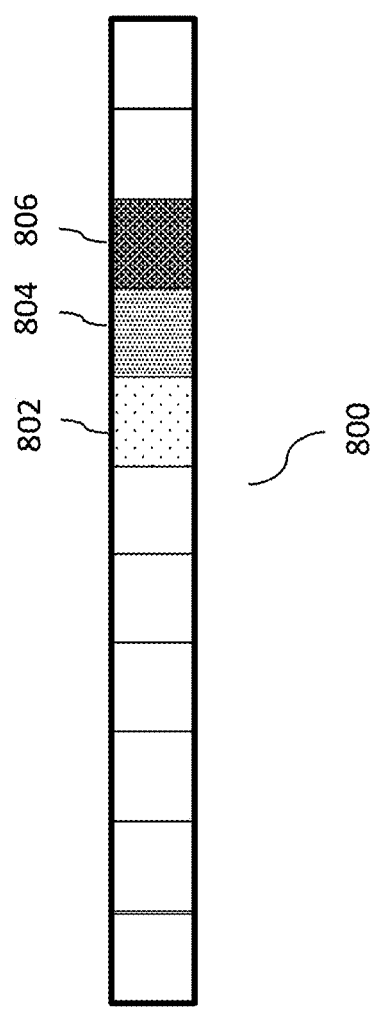
FIG. 8 is a block diagram illustrating an example of an input vector of a maximum range for a neural network model according to some implementations.
Figures 9A, 9B:
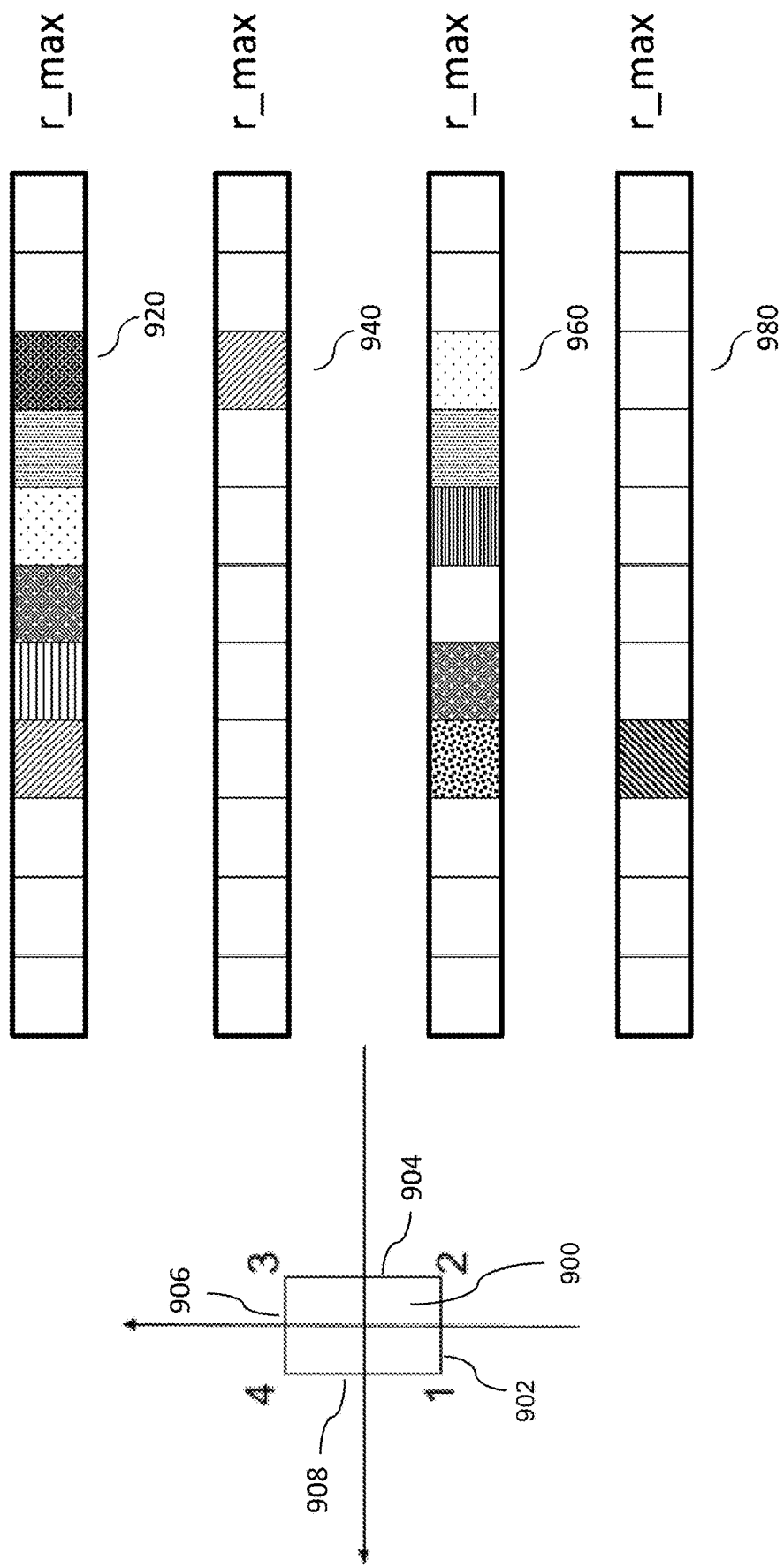
FIG. 9A and FIG. 9B are block diagrams illustrating an example of an input bounding box and input vectors for a neural network model according to some implementations.

When training of the machine learning model 602 is completed, for example, the (trained) machine learning model 602 may be configured to receive as input five feature vectors including (i) one feature vector as the feature data 637 (e.g., order statistics including mean, minimum, maximum, or percentile; see a maximum rate vector 800 in FIG. 8) and (ii) four feature vectors as the predicted state data (e.g., order statistics including mean, minimum, maximum, or percentile; see four maximum rate vectors 920, 940, 960, 980 corresponding to four sides 902, 904, 906, 908 of the predicted bounding box of the existing track in FIG. 9B). The machine learning model 602 may be also configured to generate as output three vectors including (i) one output vector indicating the center point of the track (e.g., a weight vector 1020 in FIG. 10) and (ii) two output vectors indicating range and range rate at the center point of the track (e.g., the output vectors 1040 and 1060 in FIG. 10). With these five feature vectors as input channels (c=5) and three vectors as output, in some implementations, the machine learning model 602 may have c feature vectors and have the following layer structure in this order (corresponding dimension in the parenthesis): (1) input layer (1*30*c); (2) first convolution layer (1*30*16); (3) second convolution layer (1*30*8); (3) third convolution layer (1*30*8); and (4) output layer (1*3*3). In some implementations, the machine learning model 602 may have a fully convolutional structure.

FIG. 8 is a block diagram illustrating an example of an input vector of a maximum range of radar points associated with an input track as an input channel for a neural network model according to some implementations. FIG. 8 shows an example of a feature vector 800 including a fixed number of azimuth angle bins (e.g., bins 802, 804, 806), each bin representing a maximum range (r_max) of the radar points at the corresponding azimuth angle. It is noted that although FIG. 8 shows a different color or pattern in each bin of the feature vector 800, each bin may contain a value representing a maximum range of the radar points. In some implementations, feature data (e.g., information on at least one of range, azimuth, range rate, intensity, and/or order statics thereof including mean, minimum, maximum or percentile) may be encoded into one or more channels, for example, feature vectors of fixed length (for example, 30) such that the indices of a vector represent azimuth angle bins, which span the azimuth FoV of the radar. Such FoV, in some implementations, may be centered on each track, and its range may be adaptive to the bounding box of each track. For example, as shown in FIG. 7, the FoV should enclose the whole bounding box (e.g., the bounding box 710 or 720) with additional margins at both sides of the FoV. Because the range of the FoV may change, the resolution of each bin may also change.

FIG. 9A and FIG. 9B are block diagrams illustrating an example of an input bounding box and input vectors for a neural network model according to some implementations.

In FIG. 9A, a bounding box 900 includes four sides 902, 904, 906, 908 and four corners 1, 2, 3, 4. In this example, the corner 1 can represent a corner that is the closest to an autonomous vehicle having a radar sensor. For example, referring to FIG. 9A and FIG. 9B, the associator 634 (see FIG. 6) may be configured to generate the predicted state data of the track (as prior knowledge of the target object) by sampling radar points along four sides (902, 904, 906, and 908) of the predicted bounding box 900 and radar points sampled along respective sides are encoded into four feature vectors 920, 940, 960, 980, respectively. In some implementations, each feature vector 920, 940, 960, 980 may represent maximum ranges of the radar (r_max) at the corresponding azimuth angle bins. In other implementations, each feature vector may represent other feature data such as at least one of range, azimuth, range rate, intensity, and/or order statistics thereof (e.g., minimum range, maximum range rate, minimum range rate, maximum intensity, or minimum intensity). In some implementations, all the feature vectors may be stacked, which forms an input to the model. Encoding the prior knowledge in the input of the model is important as it provides cues for the model to learn.

Figure 10:
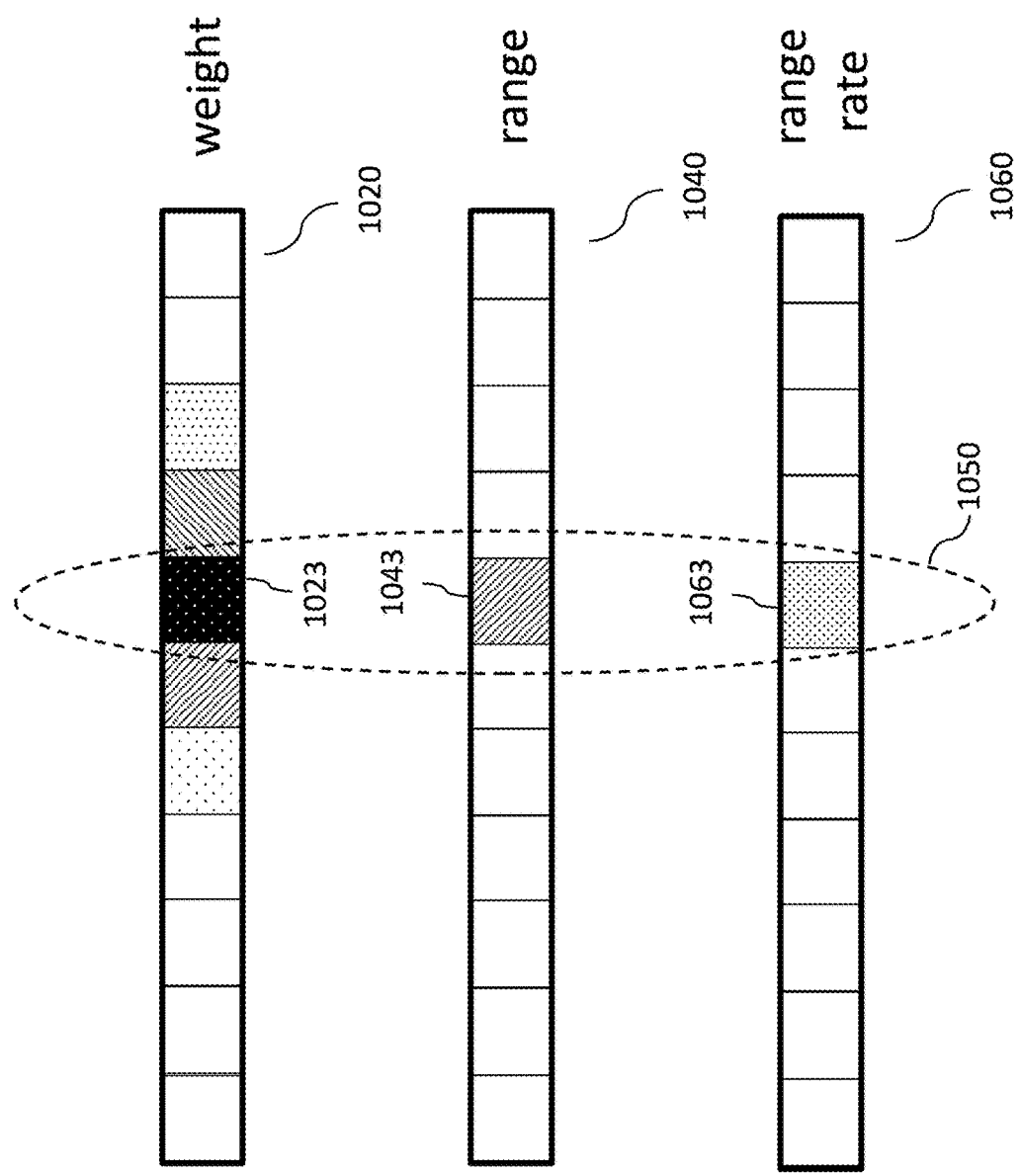
FIG. 10 is a block diagram illustrating an example of output vectors for a neural network model according to some implementations.

FIG. 10 is a block diagram illustrating an example of output vectors as output channels for a neural network model according to some implementations. In some implementations, the machine learning model 602 may be configured to output one or more output channels, for example, three vectors including one output vector indicating the center point of the track (e.g., a weight vector 1020 in FIG. 10) and two output vectors indicating range and range rate at the center point of the track (e.g., the output vectors 1040 and 1060 in FIG. 10). In some implementations, each output vector may have the same length as the feature vectors (e.g., the feature vectors 800, 920, 940, 960, 980 in FIG. 8 and FIG. 9B). The weight vector 1020 may represent a heatmap of the azimuth of the center of the track (e.g., the triangle 750 in FIG. 7), hence the azimuth estimation can be read off from the bin of the maximum value (e.g., the bin 1023 in FIG. 10). The corresponding bins in the range vector (e.g., the bin 1043) and range rate vector (e.g., the bin 1063) can provide the range and range rate estimation, respectively, at the center of the track.

Figure 11A:
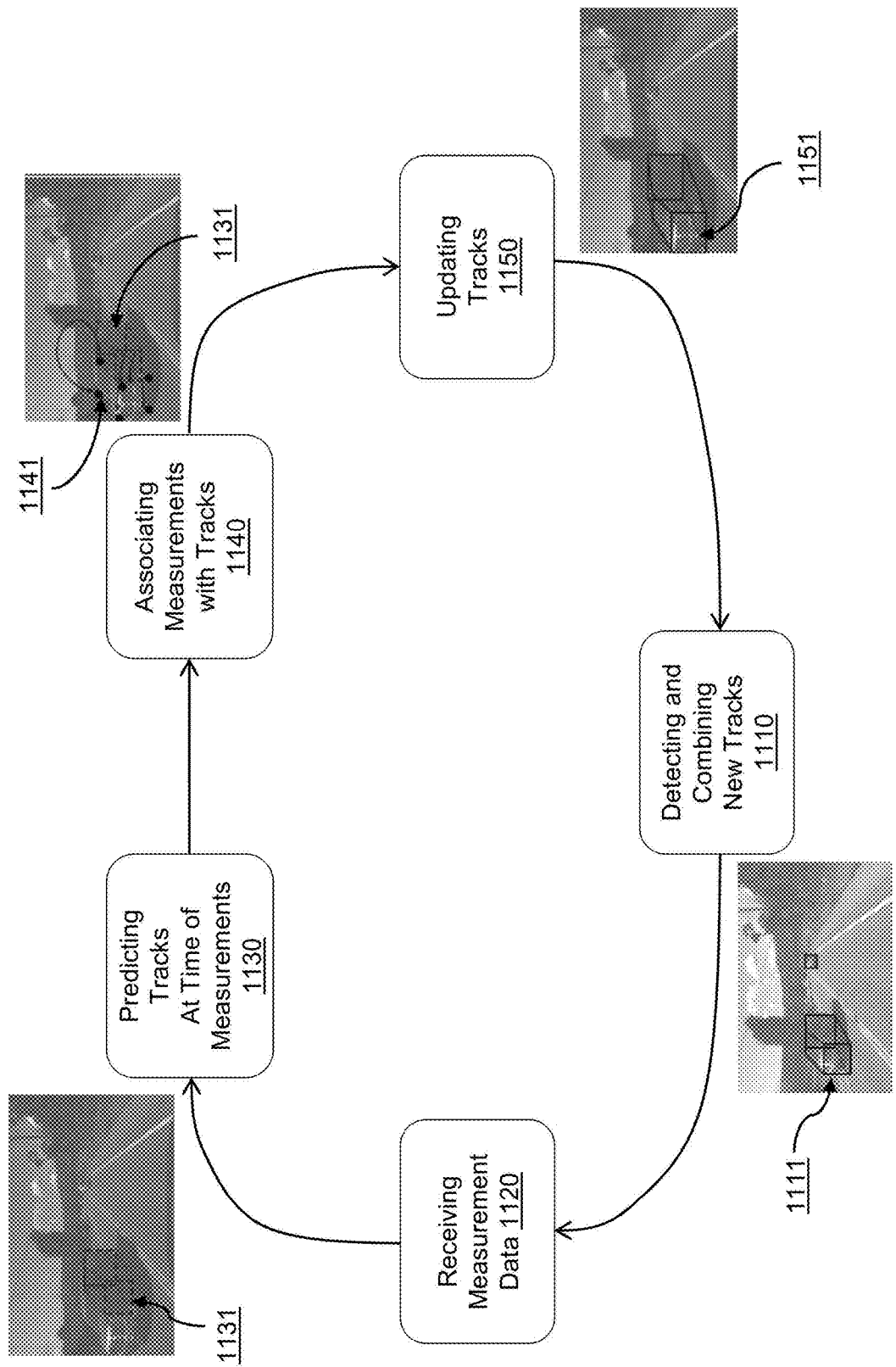
FIG. 11A is a block diagram illustrating an example flow of processing tracks according to some implementations.

FIG. 11A is a block diagram illustrating an example flow of processing tracks according to some implementations. Referring to FIG. 11A, track processing may be initiated by detecting a new track and combining it with existing tracks at step 1110. For example, at step 1110, the detector 550 may detect a new object based on unassociated detections or in response to the radar spawning new tracks. The radar tracker 517 (see FIG. 5 and FIG. 6) may propose and send a track of a new object (e.g., proposal 636 in FIG. 6) to the track combiner 606 via the track updater 604 (see FIG. 6). The track combiner 606 may combine track data of an existing track (e.g., track data) with new track data of the newly detected object (e.g., track data 636, 645, 647, 649 in FIG. 6; a 3D bounding box 1111 in FIG. 11A) received from various sources (e.g., the detector 550, lidar sensor 136, camera 140).

At step 1120, the tracker (e.g., the radar tracker 517 of the tracker 510 in FIG. 6) may receive measurement data (e.g., the radar points 631 in FIG. 6) which were measured at time $t_2$. In some implementations, the received measurement data may include radar points (e.g., radar points 631) which may contain radar points associated with different objects. However, implementations of the present disclosure are not limited thereto; the received measurement data may be any sensor data, for example, lidar sensor data or images captured by the camera 140 or a plurality of cameras 140 (see FIG. 1).

At step 1130, a track of the target object as of time $t_2$ may be predicted (e.g., as predicted state data 659 predicted by the track predictor 630 in FIG. 6) and the existing track (as prior knowledge on the target object) may rendered (e.g., the existing track 1131 in FIG. 11A). Such prior knowledge on the target object may be generated based on various information about the target object, for example, (1) sensor data from radar sensors, (2) sensor data from other sensors (e.g., lidar (Light Detection and Ranging) sensors or cameras), (3) detection data from a detector, (4) previous output data from the radar observation model itself, (5) output data from other models of the tracker, if any, or (6) output data from the tracker.

At step 1140, the associator 634 and the (learned) machine learning model 602 may associate the measurement data received at step 1120 with the predicted state data generated at step 1130, and output track data representing a single point (e.g., a center point) of a track of the target object with improved precision (e.g., the track data 639 in FIG. 6). At this step, the machine learning model 602 may detect measurements compatible or associated with the existing track (e.g., the existing track 1131 in FIG. 11A) and use the compatible measurement data (e.g., radar points 1141 in FIG. 11A) to generate track data representing a summarized output of the track with improved precision.

At step 1150, the track updater 604 or the track combiner 606 (see FIG. 6) may update track data of a predicted track (e.g., predicted track data 641) to output the updated track (e.g., the updated track 1151 in FIG. 11A) that better agrees with the improved track data (generated at step 1140), to be used at step 1110. In other words, the track may be updated to fit the improved track data.

In summary, referring to FIG. 11A, the track processing according to some implementations can detect new tracks (at step 1110) and update existing tracks (at step 1120 to 1150). The track processing according to some implementations can improve precision or accuracy of track data by utilizing prior knowledge on the target object (i.e., a prior state or a predicted state based on the prior state) in a manner similar to Kalman filtering process. This track processing can update existing tracks based on recursive estimation and thus estimated tracks can tend to become more accurate over time or maintain a desired level of accuracy over time as the object's state is changing.

Figure 11B:
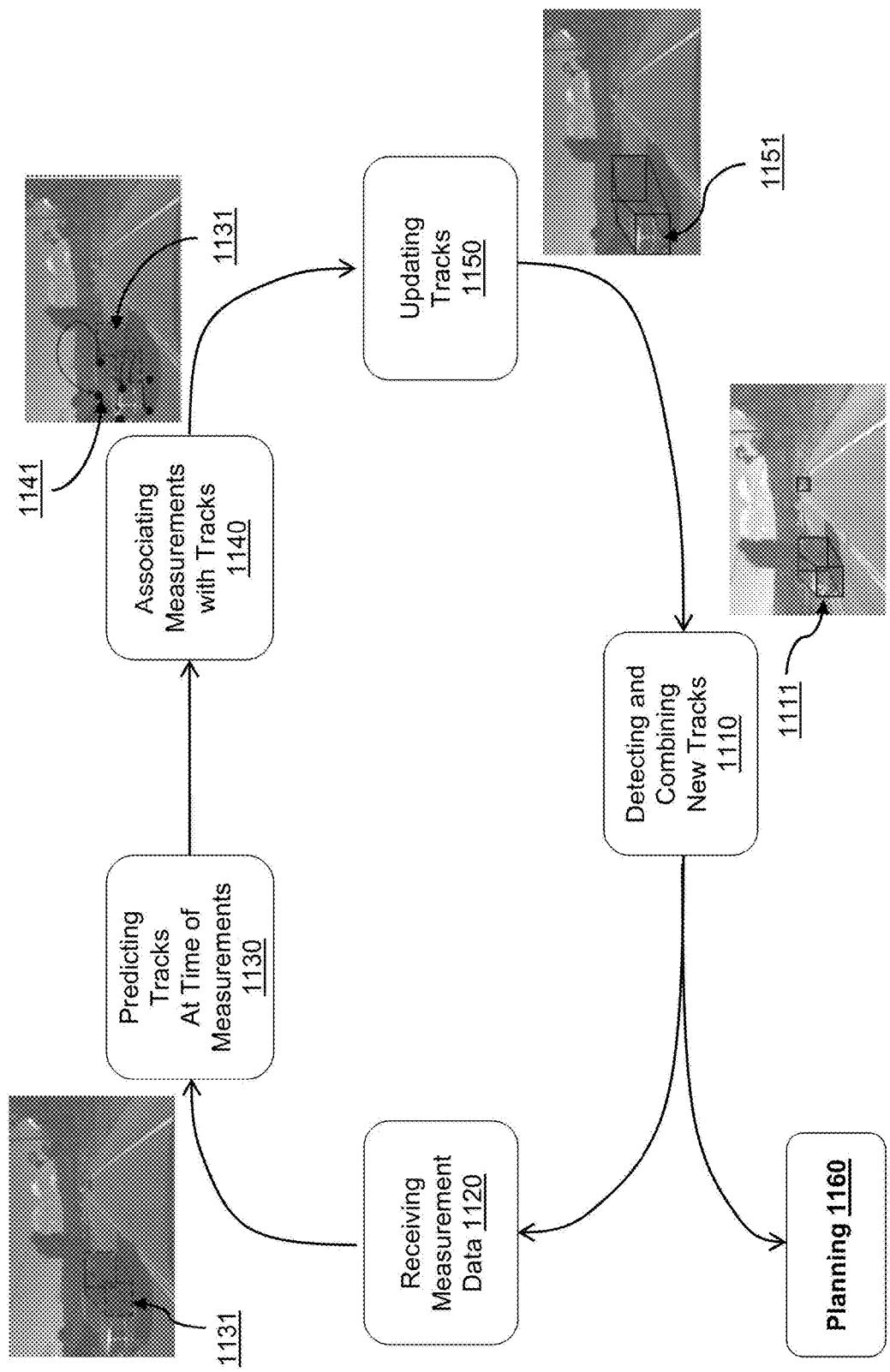
FIG. 11B is a block diagram illustrating an example flow of processing tracks according to some implementations.

FIG. 11B is a block diagram illustrating an example flow of processing tracks according to some implementations. FIG. 11B illustrates the same flow as that of FIG. 11A except for step 1160 is added. At step 1160, after combining track data of an existing track with new track data of the newly detected object, the combined track data may be input to the planning subsystem 156 so that the planning subsystem 156 can generate a trajectory for an autonomous vehicle (e.g., the vehicle 100 in FIG. 1) based on one or more tracks of objects within the environment.

In some implementations, a system (e.g., the vehicle control system 120 in FIG. 1) may include one or more processors (e.g., the processor 122) and memory (e.g., the memory 124) operably coupled with the one or more processors, wherein the memory stores instructions that, in response to the execution of the instructions (e.g., the instructions 126) by one or more processors, cause the one or more processors to obtain first information (e.g., predicted state data 659 in FIG. 6) associated with an object (e.g., the objects 530 in FIG. 5) at a first time. For example, the first information can include position and velocity of the target object at time $t_1$. The one or more processors may be configured to receive, from one or more radar sensors (e.g., the radar sensor 134 or a plurality of radar sensors 134), radar measurement data (e.g., the radar points 631 in FIG. 6) associated with the object at a second time which is later than the first time. For example, the radar measurement data (e.g., position and velocity of the target object at time $t_2$; $t_2 > t_1$) can generate a label of the radar measurement data indicating the object associated with the second time (e.g., labels in a predetermined output format generated by the labeling engine 206), and apply the first information (e.g., the predicted state data 659) and the radar measurement data (e.g., the radar points 631 in FIG. 6) as training input (e.g., feature data 637 in FIG. 6) to a machine learning model (e.g., the neural network model 602) to generate a first predicted output of the machine learning model (e.g., the output vectors in FIG. 10). The one or more processors may be configured to update one or more weights in the machine learning model by determining relevance between the first predicted output and the label of the radar measurement data, and apply the first information and the radar measurement data to the machine learning model with the updated one or more weights to generate a second predicted output of the machine learning model (e.g., the output vectors in FIG. 10) as track data associated with the object at the second time (e.g., track data 639($t_2$) in FIG. 6).

In some implementations, the first information (e.g., the predicted state data 659 in FIG. 6) may include sensor data from one or more sensors (e.g., the radar sensor 134 or a plurality of radar sensors 134). The one or more sensors may include at least one of one or more radar sensors, one or more light detection and ranging (lidar) sensors (e.g., the lidar sensor 136 or a plurality of lidar sensors 136), or one or more cameras (e.g., camera 140 or a plurality of cameras 140).

In some implementations, the first information (e.g., the predicted state data 659 in FIG. 6) may include detection data (e.g., newly or existing detected objects) from one or more detectors (e.g., the detector 550 or a plurality of detectors 550). The one or more detectors may be configured to classify an object into a particular category based on sensor data received from the one or more sensors. The one or more detectors may include one or more machine learning models to classify an object into a particular category.

In some implementations, the first information (e.g., the predicted state data 659 in FIG. 6) may include output data of the machine learning model (e.g., one of the plurality of machine learning models 632 in FIG. 6). The first information may include a predicted output of the machine learning model generated by applying radar measurement data associated with the object at the first time as training input to the machine learning model (e.g., the track predictor 608 may apply radar measurement data associated with the target object at time $t_1$ as training input to a selected one of the learned ML models 632 and include the output from the selected model in the predicted state data of the track).

In some implementations, the radar measurement data may represent a plurality of radar points (e.g., the radar points 631), and the track data (e.g., track data 639($t_2$)) may include data representing a single radar point (e.g., track data 639($t_2$) may represent a center point of the track at time $t_2$). A plurality of radar points (e.g., the radar points 631) may be measured by the one or more radar sensors (e.g., the radar sensor 134 or a plurality of radar sensors 134) as the radar measurement data.

The radar measurement data may represent a plurality of radar points (e.g., the radar points 631) associated with a track, in which each radar point is associated with at least one or more values of range, azimuth, range rate, or intensity. The radar measurement data may be encoded into one or more input channels (e.g., input feature vectors as shown in FIG. 8 and FIG. 9B), in which each input channel includes a plurality of azimuth angle bins representing a field of view of the plurality of radar points. The plurality of azimuth angle bins of each input channel contain values may represent one of maximum range, minimum range, maximum range rate, minimum range rate, or maximum intensity.

The track data (e.g., track data 639($t_2$)) may represent a single radar point associated with a center of a track (e.g., the center point 740 of the bounding box 720 in FIG. 7). The track data (e.g., track data 639($t_2$)) may include one or more output channels (e.g., the output vectors 1020, 1040, 1060 in FIG. 10), each output channel comprising a plurality of azimuth angle bins representing a field of view of the single radar point. The plurality of azimuth angle bins of each output channel may contain values representing one of weight, range, or range rate.

In some implementations, at least one non-transitory computer-readable medium includes instructions (e.g., the instructions 126 in FIG. 1) that, in response to execution of the instructions by one or more processors (e.g., the processor 122), cause one or more processors to perform operations including obtaining first information (e.g., the predicted state data 659 in FIG. 6) associated with an object (e.g., the objects 530 in FIG. 5) at a first time (e.g., position and velocity of the target object at time $t_1$). The operations may further include receiving, from one or more radar sensors (e.g., the radar sensor 134 or a plurality of radar sensors 134), radar measurement data (e.g., the radar points 631 in FIG. 6) associated with the object at a second time which is later than the first time (e.g., position and velocity of the target object at time $t_2$), generating a label of the radar measurement data indicating the object associated with the second time (e.g., labels in a predetermined output format generated by the labeling engine 206), and applying the first information (e.g., the predicted state data 659) and the radar measurement data (e.g., the radar points 631 in FIG. 6) as training input (e.g., feature data 637 in FIG. 6) to a machine learning model (e.g., the neural network model 602) to generate a first predicted output of the machine learning model (e.g., the output vectors in FIG. 10). The operations may further include updating one or more weights in the machine learning model by determining relevance between the first predicted output and the label of the radar measurement data, and applying the first information and the radar measurement data to the machine learning model with the updated one or more weights to generate a second predicted output of the machine learning model (e.g., the output vectors in FIG. 10) as track data associated with the object at the second time (e.g., track data 639($t_2$)).

Figure 12:
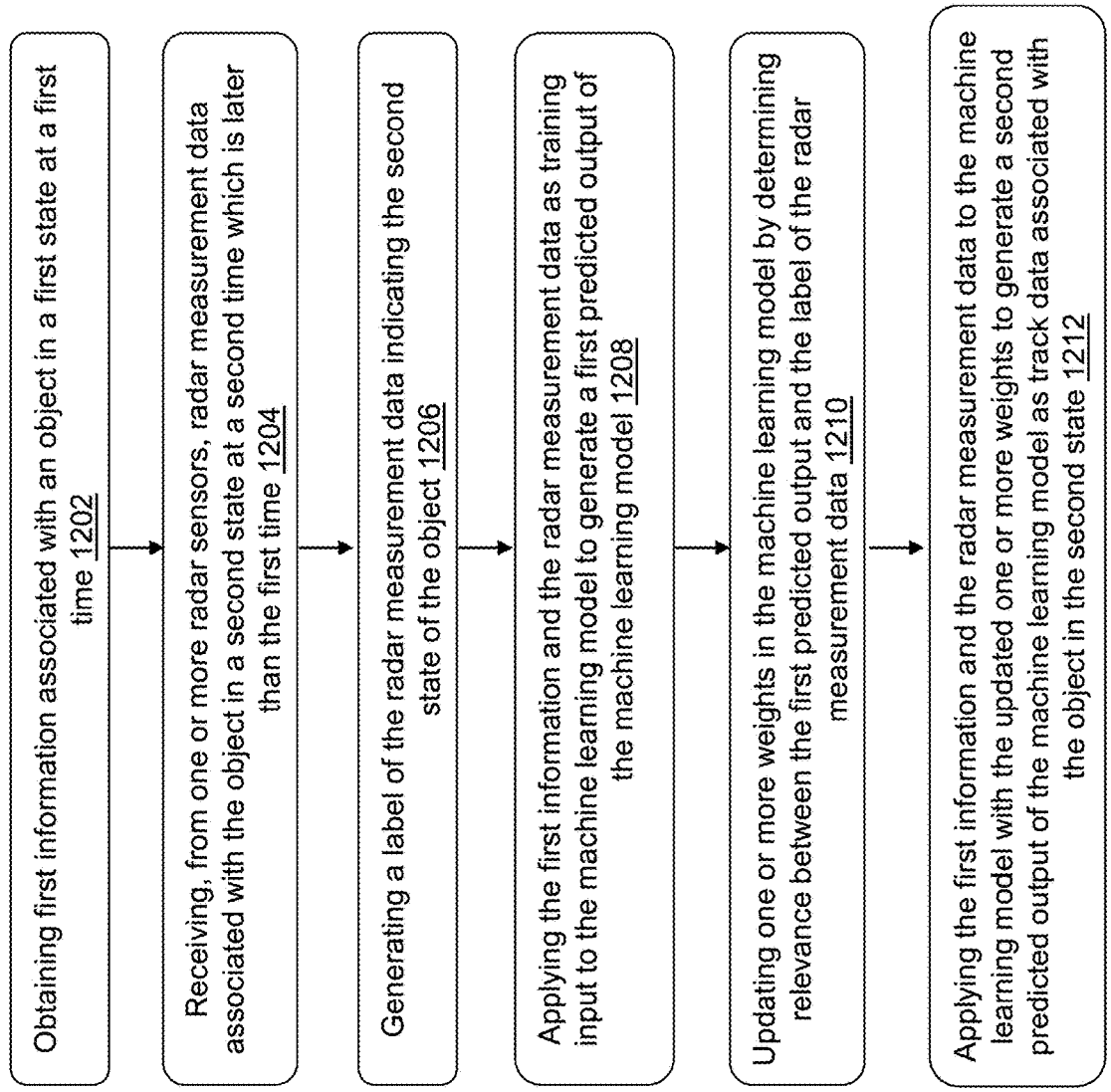
FIG. 12 is a flowchart illustrating an example methodology for feature extraction and training for a neural network model according to some implementations.

FIG. 12 is a flowchart illustrating an example methodology for feature extraction and training for a neural network model for autonomous vehicle control according to some implementations.

In this example methodology, the process begins in block 1202 by obtaining first information (e.g., the predicted state data 659 in FIG. 6) associated with an object (e.g., the objects 530 in FIG. 5) at a first time (e.g., position and velocity of the target object at time $t_1$). The first information may include sensor data from one or more sensors (e.g., the radar sensor 134 or a plurality of radar sensors 134). The one or more sensors may include at least one of one or more radar sensors, one or more light detection and ranging (lidar) sensors (e.g., the lidar sensor 136 or a plurality of lidar sensors 136), or one or more cameras (e.g., camera 140 or a plurality of cameras 140). In some implementations, the first information may include detection data (e.g., newly or existing detected objects) from one or more detectors (e.g., the detector 550 or a plurality of detectors 550). The one or more detectors may be configured to classify an object into a particular category based on sensor data received from the one or more sensors. The one or more detectors may include one or more machine learning models to classify an object into a particular category.

In some implementations, the first information (e.g., the predicted state data 659 in FIG. 6) may include output data of the machine learning model (e.g., one of the plurality of machine learning models 632 in FIG. 6). The first information may include a predicted output of the machine learning model generated by applying radar measurement data associated with the object as training input to the machine learning model (e.g., the track predictor 608 may apply radar measurement data associated with the target object at time $t_1$ as training input to a selected one of the learned ML models 632 and include the output from the selected model in the predicted state data of the track).

In block 1204, radar measurement data (e.g., the radar points 631 in FIG. 6) associated with the object at a second time which is later than the first time (e.g., position and velocity of the target object at time $t_2$) may be received from one or more radar sensors (e.g., the radar sensor 134 or a plurality of radar sensors 134). The radar measurement data may represent a plurality of radar points (e.g., the radar points 631). A plurality of radar points (e.g., the radar points 631) may be measured by the one or more radar sensors (e.g., the radar sensor 134 or a plurality of radar sensors 134) as the radar measurement data.

In some implementations, the radar measurement data may represent a plurality of radar points (e.g., the radar points 631) associated with a track, in which each radar point is associated with at least one or more values of range, azimuth, range rate, or intensity. The radar measurement data may be encoded into one or more input channels (e.g., input feature vectors as shown in FIG. 8 and FIG. 9B), in which each input channel includes a plurality of azimuth angle bins representing a field of view of the plurality of radar points. The plurality of azimuth angle bins of each input channel contain values may represent one of maximum range, minimum range, maximum range rate, minimum range rate, or maximum intensity.

In block 1206, a label of the radar measurement data indicating the object at the second time (e.g., labels in a predetermined output format generated by the labeling engine 206) may be generated.

In block 1208, the first information (e.g., the predicted state data 659) and the radar measurement data (e.g., the radar points 631 in FIG. 6) as training input (e.g., feature data 637 in FIG. 6) may be applied to the machine learning model (e.g., the neural network model 602) to generate a first predicted output of the machine learning model (e.g., the output vectors in FIG. 10).

In block 1210, one or more weights in the machine learning model (e.g., the neural network model 602) may be updated by determining relevance between the first predicted output and the label of the radar measurement data.

In block 1212, the first information and the radar measurement data as an input of the machine learning model (e.g., the feature data 637) may be applied to the machine learning model (e.g., the machine learning model trained in 1210) with the updated one or more weights to generate a second predicted output of the machine learning model (e.g., the output vectors in FIG. 10) as track data associated with the object in the second time (e.g., track data $639(t_2)$ in FIG. 6). In some implementations, the track data may include data representing a single radar point (e.g., track data $639(t_2)$ may represent a center point of the track at time $t_2$). The track data (e.g., track data $639(t_2)$) may include data representing a single radar point associated with a center of a track (e.g., the center point 740 of the bounding box 720 in FIG. 7). The track data may include one or more output channels (e.g., the output vectors 1020, 1040, 1060 in FIG. 10), each output channel comprising a plurality of azimuth angle bins representing a field of view of the single radar point. The plurality of azimuth angle bins of each output channel may contain values representing one of weight, range, or range rate.

Figure 13:
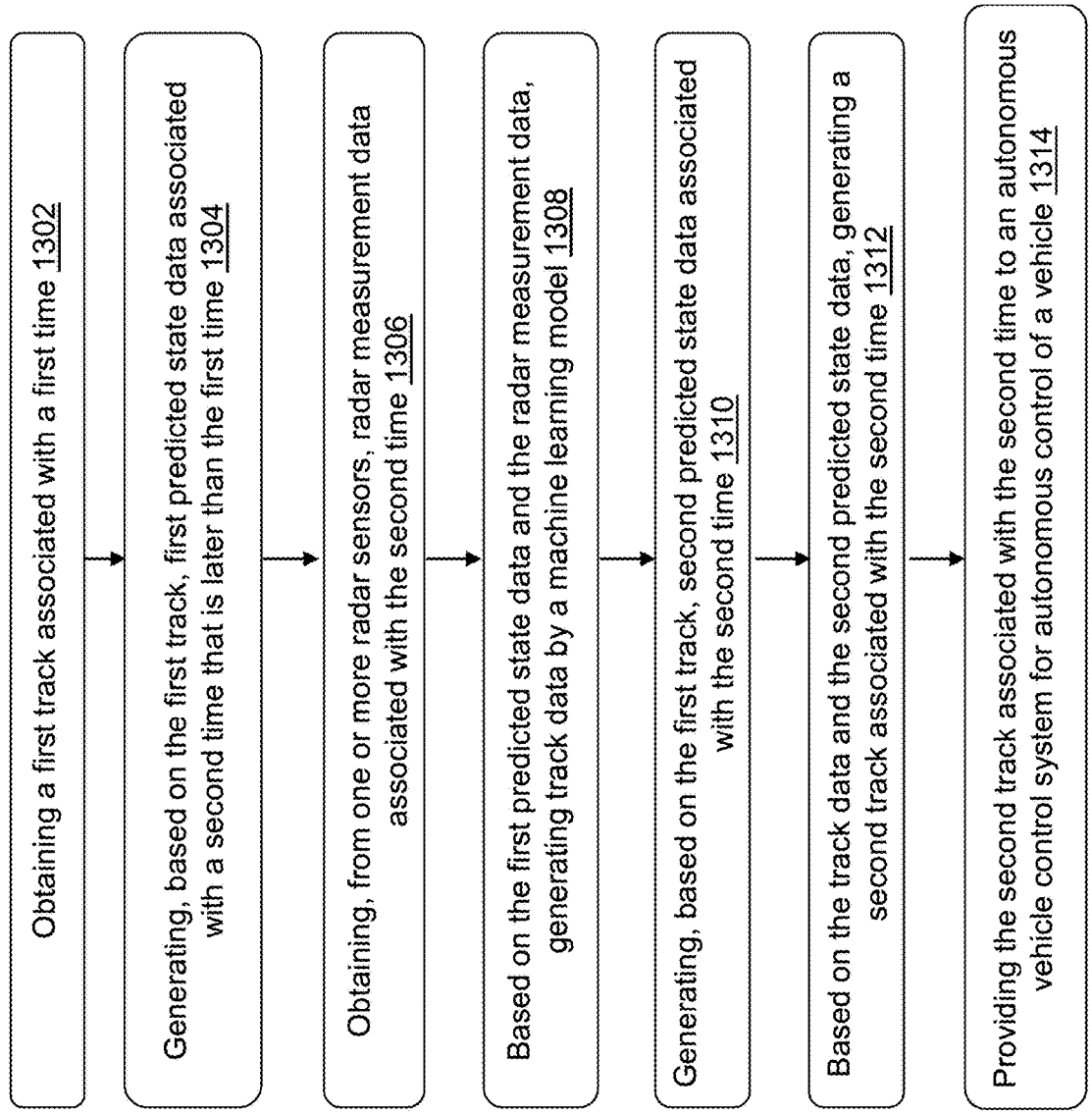
FIG. 13 is a flowchart illustrating an example methodology for generating data using a learned neural network model according to some implementations.

FIG. 13 is a flowchart illustrating an example methodology for generating data using a learned neural network model for autonomous vehicle control according to some implementations.

In this example methodology, the process begins in block 1302 by obtaining a first track (e.g., track $655(t_1)$ obtained by the track manager 512 in FIG. 5 and FIG. 6) associated with a first time (e.g., time $t_1$).

In block 1304, first predicted state data (e.g., predicted state data $659(t_2)$ generated by the track predictor 630 in FIG. 6) associated with a second time (e.g., time $t_2$) that is later than the first time (e.g., time $t_2$), may be generated based on the first track. In some implementations, the first predicted state data may include predicted position information of the first track associated with the second time (e.g., a predicted position of the track $655(t_1)$ at time $t_2$). In some implementations, the predicted position information of the first track associated with the second time may be generated by using a motion model based on a time difference between the first time and the second time (e.g., a time difference between time $t_1$ and time $t_2$). In some implementations, the motion model is at least one of the constant velocity (CV) model, the constant acceleration (CA) model, the Constant Steering Angle and Velocity (CSAV) model, the Constant Curvature and Acceleration (CCA) model, the Constant Turn Rate and Velocity (CTRV) model, or the Constant Turn Rate and Acceleration (CTRA) model, or any other motion models.

In block 1306, radar measurement data associated with the second time (e.g., radar measurement data including radar points $631(t_2)$ in FIG. 6) may be obtained from one or more radar sensors (e.g., the radar sensor 134 in FIG. 5 and FIG. 6). In some implementations, the radar measurement data may represent a plurality of radar points (e.g., radar points 631 in FIG. 6) measured by the one or more radar sensors. In some implementations, the radar measurement data may represent a plurality of radar points (e.g., radar points 631 in FIG. 6) associated with a track (e.g., track 655 in FIG. 6). In some implementations, each radar point may be associated with at least one or more values of range, azimuth, range rate, or intensity.

In block 1308, track data (e.g., track data $639(t_2)$ in FIG. 6) may be generated by a machine learning model (e.g., machine learning model 602 in FIG. 6) based on the first predicted state data (e.g., predicted state data $659(t_2)$ in FIG. 6) and the radar measurement data (e.g., radar points $631(t_2)$ in FIG. 6). In some implementations, the track data may include data representing a single radar point associated with a center of a track (e.g., the triangle 750 in FIG. 7). In some implementations, the track data may include one or more output channels (e.g., output vectors 1020, 1040, 1060 in FIG. 7), each output channel comprising a plurality of azimuth angle bins representing a field of view of the single radar point (e.g., bins in the output vectors 1020, 1040, 1060 in FIG. 7). In some implementations, the plurality of azimuth angle bins of each output channel may contain values representing one of weight (e.g., a weight vector 1020 in FIG. 10), range (e.g., an output vector 1040 in FIG. 7), or range rate (e.g., an output vector 1060 in FIG. 7).

In generating the track data by the machine learning model, a predicted bounding box of the first track (e.g., a predicted bounding box 710 in FIG. 7 or a predicted bounding box 900 in FIG. 9) may be generated based on the first predicted state data (e.g., predicted state data $659(t_2)$ generated by the track predictor 630 in FIG. 6). In some implementations, associated data (e.g., associated data 635 $(t_2)$) generated based on the radar points $631(t_2)$) may be generated by sampling radar points (e.g., the radar points 631($t_2$)) from the radar measurement data and associating the sampled radar points with a side of the predicted bounding box of the first track (e.g., four sides 902, 904, 906, 908 of the predicted bounding box of the existing track in FIG. 9B). In some implementations, the sampled radar points may be encoded into feature vectors (e.g., feature data 637 in FIG. 6). In some implementations, the track data may be generated as output data of the machine learning model (e.g., the machine learning model 602 in FIG. 6) which has the feature vectors as input data thereof. In some implementations, the feature vectors may include one or more input channels (e.g., four feature vectors 920, 940, 960, 980 in FIG. 9B), each input channel including a plurality of azimuth angle bins representing a field of view of a plurality of radar points (e.g., bins of the four feature vectors 920, 940, 960, 980 in FIG. 9B). In some implementations, the plurality of azimuth angle bins of each input channel may contain values representing one of maximum range, minimum range, maximum range rate, minimum range rate, or maximum intensity (e.g., azimuth angle bins contains values representing maximum range in FIG. 9B).

In block S1310, second predicted state data associated with the second time (e.g., second predicted state data 641($t_2$) generated by the track predictor 608 in FIG. 6) may be generated based on the first track (e.g., track 653 output from the track combiner 606 in FIG. 6). In some implementations, the second predicted state data may include predicted position information of the first track associated with the second time (e.g., track 653($t_2$)). In some implementations, the predicted position information of the first track associated with the second time (e.g., track 653($t_2$)) may be generated by using a motion model based on a time difference between the first time and the second time (e.g., a time difference between time $t_1$ and time $t_2$).

In block 1312, a second track associated with the second time (e.g., tracks 651($t_2$), 653($t_2$), 655($t_2$) generated by the track combiner 606 in FIG. 6) may be generated based on the track data (e.g., track data 639($t_2$)) and the second predicted state data (e.g., predicted state data 641($t_2$)).

In block 1314, the second track associated with the second time (e.g., track 651($t_2$) generated by the track combiner 606 in FIG. 6) may be provided to an autonomous vehicle control system (e.g., the planning subsystem 156 of the vehicle control system 120 in FIG. 1 and FIG. 6) for autonomous control of a vehicle (e.g., the vehicle 100 in FIG. 1). In some implementations, a proposal (e.g., proposal 636 in FIG. 6) that represents a third track associated with the second time, which is different from the first track (e.g., track 655 in FIG. 6), may be generated. In some implementations, a combined track of at least the second track and the third track (e.g., track 651 as a combined track of an existing track and a newly detected track; see FIG. 6) may be generated based on the proposal (e.g., proposal 636 in FIG. 6). In some implementations, the combined track associated with the second time (e.g., track 651($t_2$) generated by the track combiner 606 in FIG. 6) may be provided to the autonomous vehicle control system (e.g., the planning subsystem 156 of the vehicle control system 120 in FIG. 1 and FIG. 6) for autonomous control of the vehicle. In some implementations, the proposal may be generated without using a machine learning model (e.g., the machine learning model 602 in FIG. 6). In some implementations, the proposal may be generated based on the radar measurement data (e.g., radar measurement including radar points 631 in FIG. 6).

FIG. 14 is a flowchart illustrating an example methodology for feature extraction and training for a machine learning model for autonomous vehicle control according to some implementations.

In this example methodology, the process begins in block 1402 by obtaining a track label (e.g., position information or velocity information of a track; predicted state data 659 at time $t_2$ in FIG. 6 or predicted bounding box 710 in FIG. 7) associated with a track state, and radar measurement data at a certain timestamp associated with the track state (e.g., measurement data 631($t_2$) in FIG. 6).

In block 1404, in some implementations, a randomly perturbed track (e.g., track data 635 in FIG. 6) may be obtained by perturbing the track label in a position and velocity domain according to an error distribution between tracks and track labels. In some implementations, the error distribution may be Gaussian distribution which represents an error between track labels (e.g., position information or velocity information of predicted track data at time $t_2$) and ground truth values of tracks (e.g., position information or velocity information of actual tracks at time $t_2$). In some implementations, the error distribution can be obtained by collecting and analyzing data relating to predicted tracks and corresponding actual (ground truth) tracks. In some implementations, perturbaing the track label may be performed by a Gaussian perturbation or a regular perturbation, for example.

In block 1406, the perturbed track obtained in block 1404 (e.g., data obtained by randomly perturbing the predicted state data 659($t_2$)) and radar measurement data associated thereof (e.g., measurement data 631($t_2$) in FIG. 6) may be encoded.

In block 1408, the encoded track (e.g., input vectors 920, 940, 960, 980 in FIG. 9B) and encoded measurement data (e.g., input vector 800 in FIG. 8) may be applied as an input of a machine learning model (e.g., a neural network model 602 in FIG. 6), and an output of the machine learning model (e.g., output vectors 1020, 1040, 1060 in FIG. 10) may be generated.

In block 1410, the machine learning model may be trained based on a relevance between the output of the machine learning model and a ground truth label (e.g., by using a loss function to evaluate the relevance).

In block 1412, it may be determined whether the performance of the machine learning model can be further improved or converged. In some implementations, performance metrics such as RMSE (root mean squared error) or R square may be used to determine whether the performance of the machine learning model can be further improved or converged. In response to determining that the performance of the machine learning model can be further improved, steps 1402 through 1410 may be repeated.

In block 1414, in response to determining that the performance of the machine learning model cannot be further improved, the process may end.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. An autonomous vehicle control system comprising one or more processors and one or more memories operably coupled with the one or more processors, wherein the one or more memories store instructions that, in response to the execution of the instructions by one or more processors, cause the one or more processors to perform the following operations:

generating a first path estimation of an object;

generating, based on the first path estimation of the object and first sensor measurement data, second sensor measurement data as output data of a machine learning model;

generating, based on the first path estimation of the object, predicted position of the object;

generating, based on the second sensor measurement data and the predicted position of the object, a second path estimation of the object; and operating a vehicle based on the second path estimation.

2. The autonomous vehicle control system of claim 1, further comprising:
obtaining, from one or more radar sensors, the first sensor measurement data.

3. The autonomous vehicle control system of claim 1, wherein
the first path estimation is associated with a first time, and
the predicted position, the first sensor measurement data, and the second path estimation are associated with a second time that is later than the first time.

4. The autonomous vehicle control system of claim 3, wherein generating the predicted position of the object comprises:
generating the predicted position of the object by using a motion model based on a time difference between the first time and the second time.

5. The autonomous vehicle control system of claim 1, wherein the first sensor measurement data represents a plurality of radar points, each radar point being associated with at least one or more values of range, azimuth, range rate, or intensity.

6. The autonomous vehicle control system of claim 1, wherein generating the second sensor measurement data by the machine learning model comprises:
generating a predicted bounding box of a first path represented by the first path estimation;
sampling radar points from the first sensor measurement data;
associating the sampled radar points with a side of the predicted bounding box of the first path;
encoding the sampled radar points into feature vectors; and
generating the second sensor measurement data as output data of the machine learning model which has the feature vectors as input data thereof.

7. The autonomous vehicle control system of claim 6, wherein the feature vectors comprises one or more input channels, each input channel comprising a plurality of azimuth angle bins representing a field of view of a plurality of radar points.

8. The autonomous vehicle control system of claim 7, wherein the plurality of azimuth angle bins of each input channel contain values representing one of maximum range, minimum range, maximum range rate, minimum range rate, or maximum intensity.

9. The autonomous vehicle control system of claim 1, further comprising:
generating a proposal that represents a third path estimation of the object, which is different from the first path estimation;
generating, based on the proposal, a combined path estimation of at least the second path estimation and the third path estimation; and
performing autonomous control of the vehicle based on the combined path estimation.

10. The autonomous vehicle control system of claim 9, wherein the proposal is generated without using a machine learning model.

11. The autonomous vehicle control system of claim 9, wherein the proposal is generated based on the first sensor measurement data.

12. The autonomous vehicle control system of claim 1, wherein the second sensor measurement data includes data representing a single radar point associated with a center of a bounding box of a path of the object.

13. The autonomous vehicle control system of claim 12, wherein the second sensor measurement data comprises one or more output channels, each output channel comprising a plurality of azimuth angle bins representing a field of view of the single radar point.

14. The autonomous vehicle control system of claim 13, wherein the plurality of azimuth angle bins of each output channel contain values representing one of weight, range, or range rate.

15. A method comprising:
generating a first path estimation of an object;
generating, based on the first path estimation of the object and first sensor measurement data, second sensor measurement data as output data of a machine learning model;
generating, based on the first path estimation of the object, a predicted position of the object;
generating, based on the second sensor measurement data and the predicted position of the object, a second path estimation of the object; and
operating a vehicle based on the second path estimation.

16. The method of claim 15, wherein generating the second sensor measurement data by the machine learning model comprises:
generating a predicted bounding box of a first path represented by the first path estimation;
sampling radar points from the first sensor measurement data;
associating the sampled radar points with a side of the predicted bounding box of the first path;
encoding the sampled radar points into feature vectors; and
generating the second sensor measurement data as output data of the machine learning model which has the feature vectors as input data thereof.

17. The method of claim 16, wherein the instructions, in response to the execution of the instructions by one or more processors, cause the one or more processors to perform:
generating a proposal that represents a third path estimation of the object, which is different from the first path estimation of the object;
generating, based on the proposal, a combined path estimation of at least the second path estimation and the third path estimation; and
performing autonomous control of the vehicle based on the combined path estimation.

18. An autonomous vehicle, comprising:
at least one of a steering system or a braking system; and
a vehicle controller comprising one or more processors configured to:
generate a first path estimation of an object;
generate, based on the first path estimation of the object and first sensor measurement data, second sensor measurement data as output data of a machine learning model;
generate, based on the first path estimation of the object, a predicted position of the object;
generate, based on the second sensor measurement data and the predicted position of the object, a second path estimation of the object; and
control operation of the at least one of the steering system or the braking system based on the second path estimation.

19. The autonomous vehicle of claim 18, wherein in generating the second sensor measurement data by the machine learning model, the one or more processors are configured to:
- generate a predicted bounding box of a path represented by the first path estimation;
- sample radar points from the first sensor measurement data;
- associate the sampled radar points with a side of the predicted bounding box of the first path;
- encode the sampled radar points into feature vectors; and
- generate the second sensor measurement data as output data of the machine learning model which has the feature vectors as input data thereof.

20. The autonomous vehicle of claim 18, wherein the one or more processors are configured to:
- generate a proposal that represents a third path estimation of the object, which is different from the first path estimation;
- generate, based on the proposal, a combined path estimation of at least the second path estimation and the third path estimation; and
- control operation of the at least one of the steering system or the braking system based on the combined path estimation.

* * * * *